United States Patent
Chen

(10) Patent No.: US 10,536,389 B1
(45) Date of Patent: Jan. 14, 2020

(54) BIASED SELECTION OF DEDICATED PHYSICAL CONNECTIONS TO PROVIDER NETWORK

(71) Applicant: Amazon Technologies, Inc., Reno, NV (US)

(72) Inventor: Po-Chun Chen, Herndon, VA (US)

(73) Assignee: Amazon Technologies, Inc., Reno, NV (US)

( * ) Notice: Subject to any disclaimer, the term of this patent is extended or adjusted under 35 U.S.C. 154(b) by 673 days.

(21) Appl. No.: 14/531,919

(22) Filed: Nov. 3, 2014

(51) Int. Cl.
*G06Q 30/00* (2012.01)
*H04L 12/911* (2013.01)
(Continued)

(52) U.S. Cl.
CPC .......... *H04L 47/70* (2013.01); *G06Q 10/067* (2013.01); *G06Q 10/06315* (2013.01); *G06Q 10/103* (2013.01); *G06Q 10/105* (2013.01); *G06Q 30/00* (2013.01); *G06Q 30/02* (2013.01); *G06Q 30/0206* (2013.01); *G06Q 30/0235* (2013.01); *G06Q 30/0255* (2013.01); *G06Q 30/06* (2013.01); *G06Q 40/00* (2013.01); *H04L 41/04* (2013.01)

(58) Field of Classification Search
CPC .......... G06Q 30/0255; G06Q 30/0235; G06Q 10/105; G06Q 10/103; G06Q 10/067; G06Q 30/02; G06Q 10/06315; G06Q 40/00; G06Q 30/00; G06Q 30/06; H04Q 7/20
See application file for complete search history.

(56) References Cited

U.S. PATENT DOCUMENTS

| | | |
|---|---|---|
| 8,724,642 B2 | 5/2014 | Miller et al. |
| 8,848,717 B2 * | 9/2014 | Yan .................. H04L 45/245 370/392 |

(Continued)

OTHER PUBLICATIONS

Rauscheckeret al., Cloud-Based Manufacturing-As-A-Service Environment for Customized Products, eChallenges e-2011 Conference Proceedings. IIMC International Information Management Corporation, ISBN: 978-1-905824-27-4 (Year: 2011).*

(Continued)

*Primary Examiner* — Amber A Misiaszek
*Assistant Examiner* — Uche Byrd
(74) *Attorney, Agent, or Firm* — Robert C. Kowert; Kowert, Hood, Munyon, Rankin & Goetzel, P.C.

(57) ABSTRACT

A connectivity coordinator may receive a request for a dedicated physical connection between a provider network and a client network. In response, the connectivity coordinator may determine a capacity for each connection capacity group available to accept the dedicated physical connection. The connectivity coordinator may use the determined capacities for each available connection capacity group to determine bias response information for each connection capacity group based on the determined capacities and a capacity bias model. The connectivity coordinator may provide the determined bias response information to the client as part of a response to the connectivity request to influence the client to select to connect to a connection capacity group that has more physical ports available to accept the dedicated physical connection than other connection capacity groups that have less ports available to accept the dedicated physical connection.

20 Claims, 11 Drawing Sheets

(51) Int. Cl.
*G06Q 30/02* (2012.01)
*H04L 12/24* (2006.01)
*G06Q 40/00* (2012.01)
*G06Q 10/10* (2012.01)
*G06Q 30/06* (2012.01)
*G06Q 10/06* (2012.01)

(56) References Cited

U.S. PATENT DOCUMENTS

| | | | | |
|---|---|---|---|---|
| 8,959,203 | B1* | 2/2015 | Miller | H04L 47/00 709/223 |
| 2002/0111883 | A1* | 8/2002 | Cerami | G06Q 10/087 705/28 |
| 2003/0191841 | A1* | 10/2003 | DeFerranti | H04L 12/14 709/226 |
| 2011/0255534 | A1* | 10/2011 | Yano | H04L 45/00 370/389 |
| 2014/0137109 | A1* | 5/2014 | Sharma | H04L 49/70 718/1 |

OTHER PUBLICATIONS

U.S. Appl. No. 14/534,102, filed Nov. 5, 2014, Shuguang Wang.
U.S. Appl. No. 13/306,801, filed Nov. 29, 2011, Kevin Christopher Miller.
U.S. Appl. No. 13/335,465, filed Dec. 22, 2011, Andrew J. Doane.
U.S. Appl. No. 13/555,360, filed Jul. 23, 2012, Patrick Brigham Cullen.

* cited by examiner

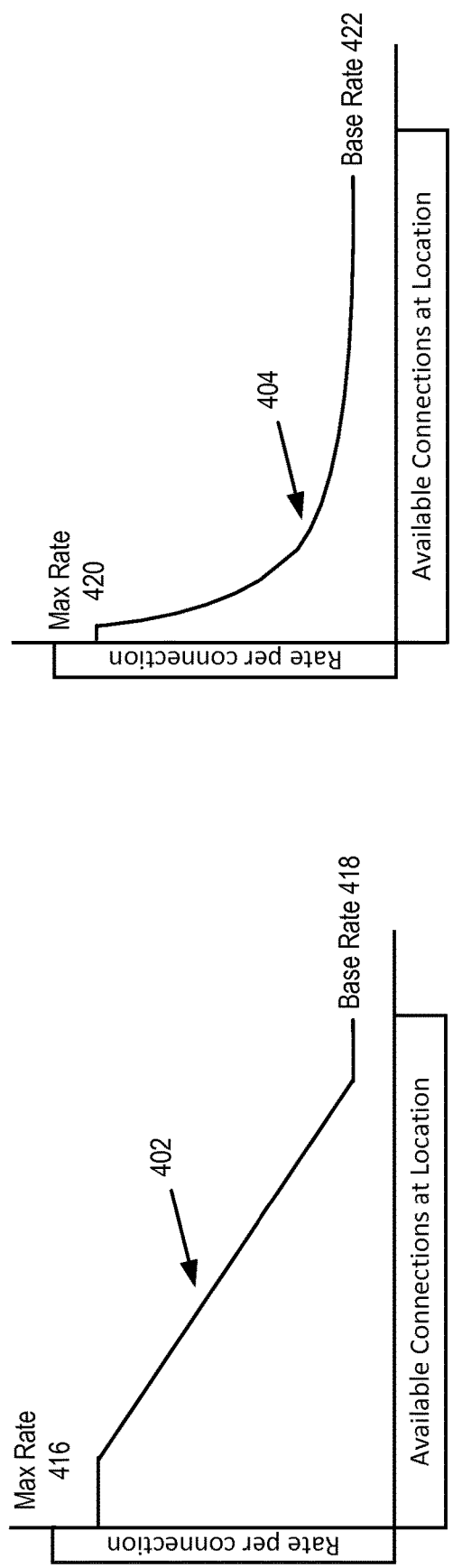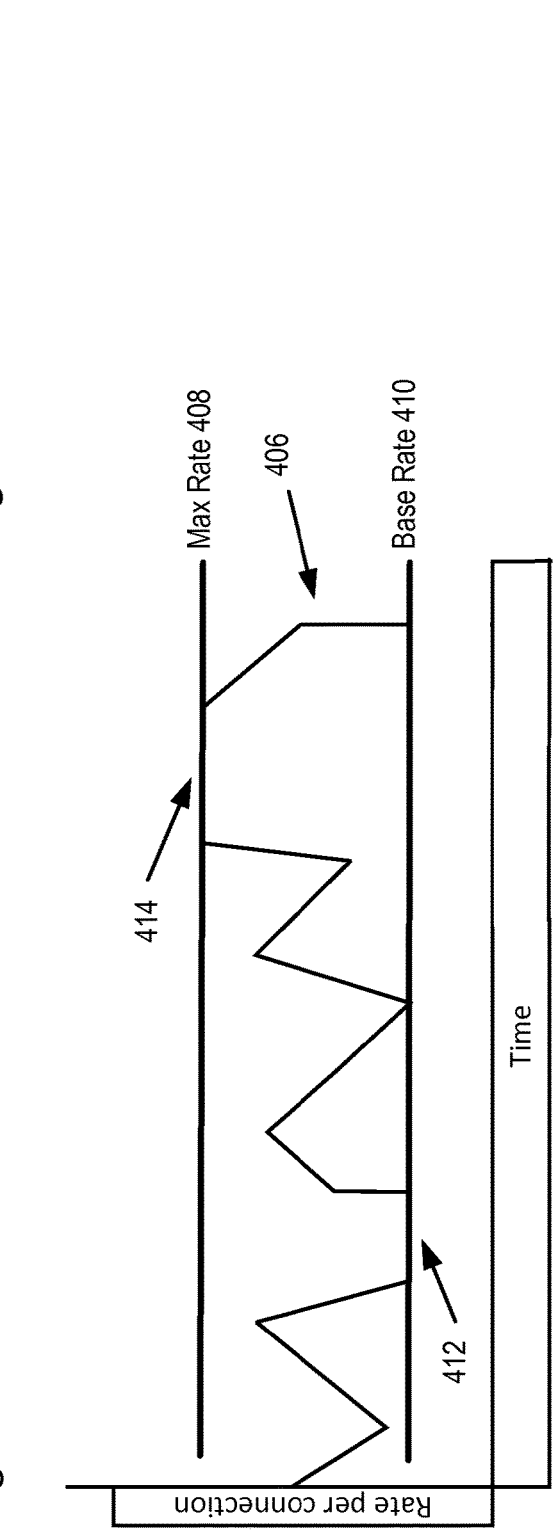

800

Connectivity Center Home Page https://ABCconnectivity.com

Dear John Doe, Welcome to Connectivity Center!

Just provide your connectivity requirements below, ← 802
submit the form, and get your selection information in seconds!

| Address where you need the connection: | Street | | ← 804 |
| | City, State, Zip | | |
| | Country | | |

Bandwidth:
- ○ 1 Gbps
- ● 10Gbps
- ○ Other (specify)

← 806

Your Router Equipment:
- Vendor Name
- Model

← 808

Your Budget — (Maximum acceptable rate per connection) ← 810

SUBMIT ← 812

*Figure 8*

BIASED SELECTION OF DEDICATED PHYSICAL CONNECTIONS TO PROVIDER NETWORK

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each virtual machine being a software simulation acting as a distinct logical computing system that provides users with the illusion that they are the sole operators and administrators of a given hardware computing resource, which also provides application isolation and security among the various virtual machines. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Virtualization technologies have given rise to provider networks, which offer various services or resources to customers via network connections. As the amount of data, transactions, and other interactions with provider networks increase, so too do the various connection requirements for customers of provider networks. Some customers, may wish to take advantage of private or direct connections to provider networks, rather than utilizing publicly available connections (e.g., via the Internet). In this way, the connections between these customers and provider networks can be optimized for performance and increased utilization of provider network resources.

BRIEF DESCRIPTION OF THE DRAWINGS

FIG. 4A is a graph of a bias model based on a linear relationship between available connections and price per connection, according to some embodiments.

FIG. 4B is a graph of a bias model based on an exponential relationship between available connections and price per connection, according to some embodiments.

FIG. 4C is a graph of a price per connection for a particular connection capacity group over time, according to some embodiments.

FIG. 8 is a diagram illustrating a graphical user interface for requesting a dedicated physical connection from a client network to a provider network, according to various embodiments.

Figure 1:
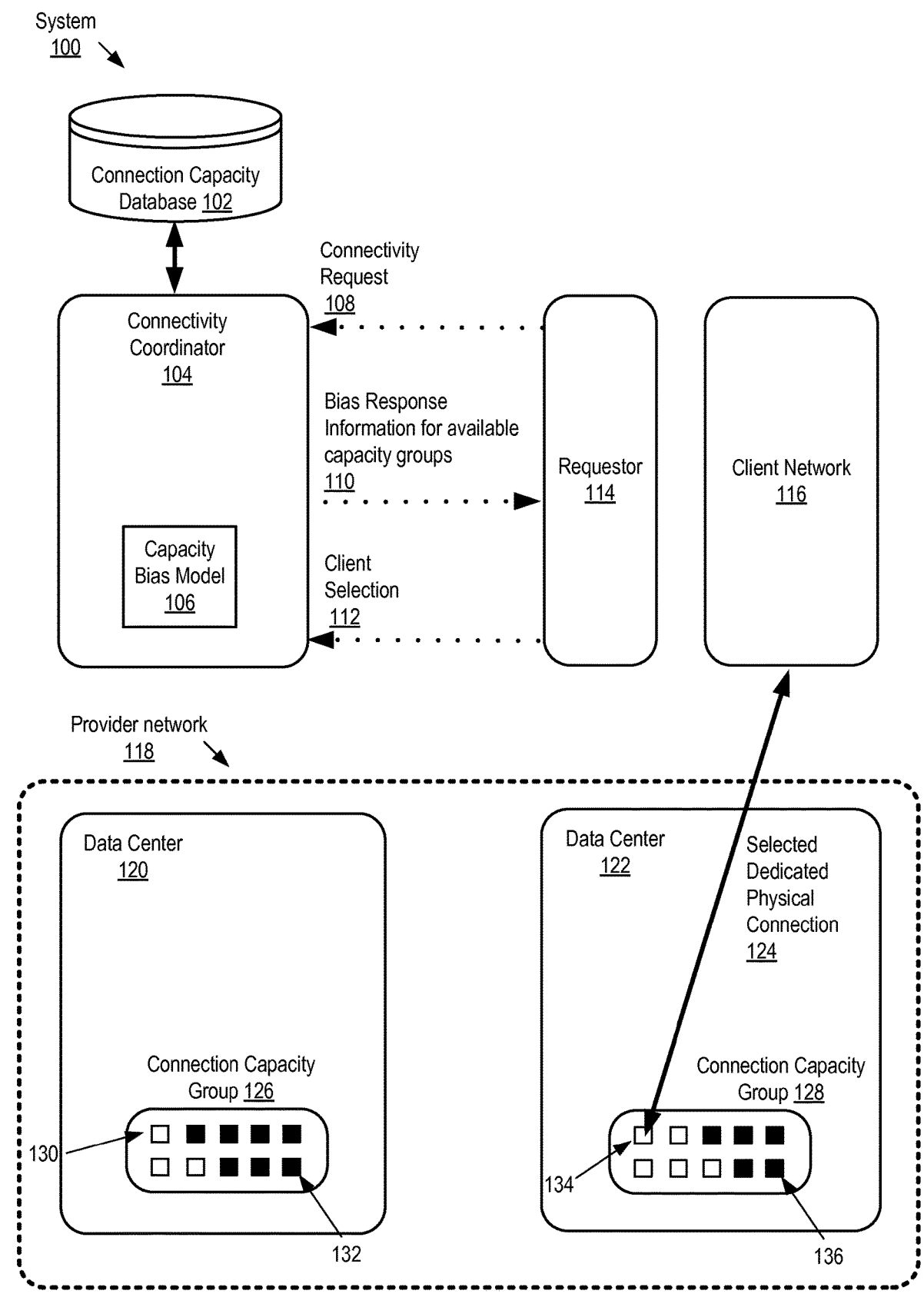
FIG. 1 is a diagram of providing bias response information to a client requesting a dedicated physical connection to a provider network, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be used to manage dedicated physical connections to a provider network by using a bias model. A provider network may supply clients, operators, or other customers with access to and/or control of one or more computing resources. These resources may include various types of computing systems or devices configured for communication over a network. For example, in some embodiments, a provider network may provide virtual computing resources to clients, users, or other type of customers, in the form of reserved compute instances (e.g., a virtual machine acting as a distinct logical computing system that provides users with the illusion that they are the sole operators and administrators of a given hardware computing resource). Customers of the provider network may reserve (e.g., purchase or buy) one or more compute resources (such as compute instances) or utilize other resources to perform various functions, services, techniques, and/or applications.

A given provider network may typically include several large data centers hosting various resource pools, such as collections of physical and/or virtualized computer servers, storage devices, networking equipment and the like, needed to implement, configure and distribute the infrastructure and services offered by the provider. In order to extend the geographical areas over which its services can be accessed with desired levels of performance, reliability and security, an operator of a provider network may establish private or dedicated network paths between its data centers and one or more networking devices that may be physically located at an external client facility. A networking device may include network routers, switches, hubs, gateways, bridges, etc. Router is used as an example throughout the specification, but other networking devices could be used in place of routers.

A given provider network facility, for example a data center, may include a router linked by a dedicated physical connection to another router belonging to or owned by an entity (e.g. a customer of the provider network) operating a client network that is external to the provider network. In this way various systems, components, and/or devices implemented within the client network may utilize the dedicated physical connection for traffic between provider network resources assigned to the customer (such as compute instances, storage service nodes and the like) and external resources located outside the provider network. The dedicated physical connection between a router of a data center and a client network may be established by physically connecting a port of a provider network router to a port of a router of a client network via a cable such as a fiber optic cable, copper cable, and the like.

In some embodiments a data center may have a limited number of physical ports that can accept dedicated physical connections from a provider network to a client network. For example, the number of ports at a data center may depend on the number of and types of routers installed at the data center. Furthermore, a given data center may include routers with different types of ports or individual routers with different types of ports. A group of ports available to accept a dedicated physical connection at a data center may be considered to be a connection capacity group. In some embodiments a particular data center may comprise multiple separate and distinct connection capacity groups. Also, a particular connection capacity group may comprise ports of one type while a different connection capacity group may comprise ports of another type or a given connection capacity group may comprise a set number of ports of a particular type and a different set number of ports of another type. For example a data center of a provider network may comprise a first connection capacity group and a second connection capacity group that are separate and distinct from each other. In this example, the first connection capacity group may comprise a set number of routers that comprise 1-gigabyte ports and 10-gigabyte ports. The second connection capacity group may comprise a set number of routers that only comprise 1-gigabyte ports. The first connection capacity group that comprises 1-gigabyte ports and 10-gigabyte ports may include routers that comprise 1-gigabyte ports and routers that comprise 10-gigabyte ports or individual routers that comprise both 1-gigabyte ports and 10-gigabyte ports. In some embodiments, other combinations of different types of ports may be included in a connection capacity group, for example, other bandwidth designations or transfer mediums such as copper wire, fiber optic, and the like. Each router included in a connection capacity group may have a set number of ports so that the number of routers included in a capacity group and the number of ports of a specific type included in each router at the connection capacity group may set the number of ports of a specific type included in the connection capacity group.

Due to the set number of ports of each specific port type at each connection capacity group being defined by the physical infrastructure at each connection capacity group such as the number and types of routers at each connection capacity group, there may be a need to balance utilization of ports of specific types at two or more connection capacity groups of a provider network. For example, an operator of a provider network may selectively decide to invest in adding additional port capacity at some data centers of the provider network before adding additional port capacity to other data centers of the provider network. In order to add additional port capacity, one or more additional routers may be installed at a particular connection capacity group resulting in an increased number of ports at the connection capacity group. The addition of one or more routers at a connection capacity group may result in a step change in the port capacity at the particular connection capacity group. However, client demand for dedicated physical connections at the particular connection capacity group may increase incrementally. Therefore, due to the step change in capacity it may be desirable to influence customers to select to connect to the provider network at the connection capacity group with excess capacity as opposed to connecting to different connection capacity groups of the provider network that have fewer ports available to accept a dedicated physical connection.

In some embodiments, a particular customer of the provider network may operate a client network that can easily be connected to the provider network via a dedicated network connection at multiple connection capacity groups located in multiple data centers of the provider network. For example, a client of the provider network may be a large corporation that operates an enterprise network that spans a large geographic region, such as the United States. The client network may be proximately located to multiple data centers of the provider network that include connection capacity groups that comprise ports available to accept dedicated physical connections from the client network to the provider network. However, the capacity to accept a dedicated physical connection at a particular connection capacity group, for example a particular data center may be less than a capacity at another connection capacity group for example a separate data center. It may be advantageous to the operator of the provider network to influence the client to select to connect to the provider network at the connection capacity group with the greater capacity to accept dedicated physical connections than other connection capacity groups with less capacity to accept dedicated physical connections. Thus leaving capacity at the connection capacity groups with a limited number of available ports to be available for use by other clients of the provider network.

In another example, a client of the provider network may be a small company with a single location and a client network that is geographically located in a single location. It may not be practical for the small company client to connect to the provider network at a connection capacity group that is not geographically near the geographic location of the small company's client network. If there are a limited number of ports available at a connection capacity group near the small company's client network location, it may be advantageous to influence a large corporation, such as the large corporation described in the previous example, to select to connect to the provider network at a connection capacity group that has a high number of available ports so that there will be available ports at the geographic location near the small company. Since, the large corporation operates an enterprise network that spans a large geographical area, the costs for the large corporation to install the necessary infrastructure for connecting to a particular connection capacity group versus another particular connection capacity group may be approximately equal. However, because the small company only operates in a particular geographic location, the costs for the small company to install the necessary infrastructure to connect to a connection capacity group that is not near the geographic location of the small company may be excessive such that the small company is effectively prohibited from obtaining a direct physical connection to the provider network if there are not available ports at the connection capacity group geographically nearest the small company.

In some embodiments, managing dedicated physical connections to a provider network using a bias model may include a system comprising the provider network, connection capacity groups, and a connectivity coordinator implemented by one or more compute nodes. The provider network may provide compute resources to clients and may include compute resources for use by the provider network. In some embodiments, the connectivity coordinator may be implemented on compute nodes of the provider network and in some embodiments, the connectivity coordinator may be implemented on compute nodes outside of the provider network.

The connection capacity groups may include separate and distinct connection capacity groups located in different locations, for example in different data centers or in different locations in a single data center. Each connection capacity group may include a particular number of physical ports configured to accept a dedicated physical connection from a client network to the provider network for access to compute resources of the provider network. For example, a client of the provider network may reserve compute instances that are implemented on compute resources of the provider network. The client may establish a direct physical connection between the client's network and the provider network via a physical port of a connection capacity group so that the client can directly access the instances reserved by the client that are implemented on the compute resources of the provider network.

The connectivity coordinator may receive a connectivity request, via a network-based interface, from a client for connectivity from a particular client network to the provider network via a dedicated physical connection. For example, the connectivity coordinator may receive a client request submitted via a web page by a client requesting to connect to the provider network with a dedicated physical connection. In response to receiving the connectivity request, the connectivity coordinator may determine a capacity to accept dedicated physical connections at connection capacity groups that comprise physical ports available to accept the dedicated physical connection requested by the client. In some embodiments, the client request may specify a specific type of port for the dedicated physical connection and the connection capacity groups may include physical ports of different types. For example, a connection capacity group may include 1-gigabyte ports and 10-gigabyte ports, or some other type of port. A capacity determined by the connectivity coordinator for a particular connection capacity group may be based on the number of physical ports available to accept a dedicated physical connection at the particular connection capacity group. The connectivity coordinator may also, determine bias response information for each respective available connection capacity group based on the determined capacity at each respective available connection capacity group. The bias information may be determined in order to influence the client submitting the connectivity request to select to connect the client's network to the provider network at a connection capacity group that has more available ports for accepting a dedicated physical connection relative to other connection capacity groups. The connection coordinator may send a response to the client comprising the determined bias response information. For example, the connectivity coordinator may send information that is displayed to the client on a webpage that shows a list of available connection capacity groups to which the client may connect. The bias response information may be displayed on the webpage to influence the client to select a connection capacity group that has more capacity to accept the dedicated physical connection than other connection capacity groups displayed on the webpage.

In some embodiments, managing dedicated physical connections to a provider network using a bias model may include a connectivity coordinator implemented by one or more computers receiving a connectivity request from a client of a provider network requesting connectivity from a client network to the provider network via a dedicated physical connection. The connectivity coordinator may determine a capacity for one or more connection capacity groups that each comprise physical ports available to accept the dedicated physical connection. Each respective capacity for respective connection capacity groups determined by the connectivity coordinator may be based on a number of physical ports available to accept the dedicated physical connection at the particular respective connection capacity group. The connectivity coordinator may dynamically determine bias response information for each respective connection capacity group based on the determined capacities at each respective available connection capacity group. The bias response information may be determined in order to influence the client to select a particular connection capacity group that has a greater number of physical ports available to accept the dedicated physical connection than other connection capacity groups. The connectivity coordinator may send a response to the client that includes the determined bias response information.

In some embodiments, managing dedicated physical connections to a provider network using a bias model may include a non-transitory computer-accessible storage medium storing program instructions that when executed by a processor implement a connectivity coordinator. The connectivity coordinator may be configured to receive a connectivity request from a client of the provider network for connectivity from a client network to the provider network via a dedicated physical connection. The connectivity coordinator may be configured to determine a capacity for each of one or more connection capacity groups that comprise physical ports available to accept the dedicated physical connection from the client network to the provider network in response to receiving the connectivity request. The respective capacities of each available connection capacity group determined by the connectivity coordinator may be based on a number of physical ports available to accept the dedicated physical connection at a particular respective available connection capacity group. The connectivity coordinator may be configured to dynamically determine bias response information for each respective available connection capacity group based on the determined capacity at each respective available connection capacity group. The bias response information may be determined in order to influence the client submitting the connectivity request to select a connection capacity group with a greater number of physical ports than other connection capacity groups of the one or more available capacity groups. The connectivity coordinator may be configured to send a response to the client that includes the determined bias response information in order to influence the client's selection of a connection capacity group.

FIG. 1 is a diagram of providing bias response information to a client requesting a dedicated physical connection to a provider network, according to some embodiments. A system may connect one or more client networks to a provider network. A client network may be an enterprise network of a large corporation or a single local area network in a specific geographic location. In some embodiments a client network may encompass varying sizes and geographic locations. For example, in FIG. 1, a client network is represented by client network 116. A provider network may include one or more data centers maintained to provide services to clients, such as cloud computing services or cloud storage services amongst other services. A provider network may be of varying sizes and include multiple data centers that are geographically separated. For example, in FIG. 1, an example of a provider network is represented by provider network 118. A client coordinator may be included in a system for providing dedicated physical connections between a provider network and a client network. A connectivity coordinator may receive requests from clients of a provider network or from requestors on behalf of clients of a provider network requesting a dedicated physical connection from a client network to a provider network. For example, in FIG. 1, connectivity coordinator 106 receives connectivity request 108 from requestor 114 on behalf of client network 116. A connectivity coordinator may use information stored in a database, for example a connection capacity database 102, to determine capacities of locations that can accept dedicated physical connections. For example, the locations available to accept a dedicated physical connection may be located in connection capacity groups that are located in data centers of a provider network. For example the locations available to accept a dedicated physical connection may include connection capacity groups 126 and connection capacity group 128 of data centers 120 and 122.

A connectivity coordinator, for example connectivity coordinator 104, may include a capacity bias model that defines relationships between available capacities at connection capacity groups and rates charged to clients of a provider network to establish dedicated physical connections with respective connection capacity groups. The rates may be determined based on a bias capacity model for a particular connection capacity group and respective capacities at particular connection capacity groups. The rates may be included in response information sent to a client of a provider network in response to a connectivity request, for example bias response information for available capacity groups 110 is being sent to requestor 114. A capacity bias model may be used to determine rates for individual connection capacity groups (for example capacity bias model 106), so that connection capacity groups with less capacity are associated with higher rates than connection capacity groups with more capacity. Because bias response information may include different rates for different connection capacity groups based on available capacities, bias response information may influence clients of the provider network to select dedicated physical connection at connection capacity groups that have more available capacity because the rates offered for connections to the connection capacity groups with more available capacity may be advantageous to the client in comparison to rates offered for connection capacity groups with less available capacity (e.g. the rates may be higher at the locations with less capacity).

An example system 100 of a system for connecting client networks to provider networks is depicted in FIG. 1. System 100 includes a connection capacity database 102, connectivity coordinator 104 and provider network 118. Connectivity coordinator 104 is communicatively coupled to connection capacity database 102 and is in communication with a requestor 104. In the depiction illustrated in FIG. 1, connectivity coordinator 104 is outside provider network 118. In some embodiments, a connectivity coordinator, such as connectivity coordinator 104 may be inside a provider network, such as provider network 118. In some embodiments connectivity coordinator 104 may be implemented by compute resources of a provider network, such as provider network 118 and in some embodiments connectivity coordinator may be implemented by compute resources external to a provider network, such as provider network 118. A connectivity coordinator may be communicatively coupled to a connection capacity database by suitable known methods. In some embodiments, connection capacity database 102 may be part of a provider network, such as provider network 118.

In the example illustrated in FIG. 1, requestor 114 sends connectivity request 108 to connectivity coordinator 104 requesting a dedicated physical connection to provider network 118 for client network 116. In the depiction illustrated in FIG. 1, requestor 114 is separate from client network 116. In some embodiments, requestor 114 may be located within client network 116. In some embodiments, requestor 114 may be external to client network 114 and may submit connectivity request 108 requesting a dedicated physical connection between client network 116 and provider network 118 even though requestor 114 is external to client network 116.

In the example illustrated in FIG. 1, provider network 118 includes data centers 120 and 122. A general description of provider networks is given further below. A data center may include multiple connection capacity groups. And, a connection capacity group may include available physical ports that are available to accept a dedicated physical connection and unavailable physical ports that are currently in use. For example, data center 120 includes connection capacity group 126. Connection capacity group 126 includes available physical ports 130 and unavailable physical ports 132 that are currently consumed by a client of the provider network to provide a dedicated physical connection between client networks and provider network 118. In some embodiments, unavailable physical ports 132 may be consumed by resources of provider network 118 that are allocated to clients and may be consumed by resources of provider network 118 that are used for the operation of provider network 118 but are not allocated to clients. In some embodiments, available physical ports 130 and unavailable physical ports 132 may be ports of a patch panel coupled to a router. The quantity of total ports at connection capacity group 126 including available ports 130 and unavailable ports 132 may be determined by a number of connections included in one or more routers associated with connection capacity group 126. For example, a particular router may comprise 10 10-gigabyte ports, and a connection capacity group may comprise 10 of the particular routers. Therefore the total number of physical ports including available ports and unavailable ports at a connection capacity group, such as available ports 130 and unavailable ports 132 of connection capacity group 126, may be 100 10-gigabyte ports. In some embodiments, connection capacity groups may comprise different combination of routers that have different port types.

In the example illustrated in FIG. 1, data center 122 includes connection capacity group 128. Connection capacity group 128 may include available physical ports 134 and unavailable physical ports 136. Available ports 134 and unavailable ports 136 of connection capacity group 128 of data center 122 may be similar to available ports 130 and unavailable ports 132 of connection capacity group 126 of data center 120. As an example, connection capacity group 128 is illustrated in FIG. 1 as including five available ports 134, whereas connection capacity group of data center 120 is illustrated as including three available ports 130. Any number of available ports 134 and available ports 130 may be available at a particular point in time, the five available ports 134 of connection capacity group 128 and the three available ports of connection capacity group 126 are given as an example to illustrate a moment in time when connection capacity group 128 has a greater quantity of available ports than connection capacity group 126. At a particular point in time either connection capacity group 126 or connection capacity group 128 may have a greater number of available ports depending on the total amount of ports at connection capacity group 126 and the total amount of ports at connection capacity group 128 and also depending on the number of unavailable ports at each respective connection capacity group, e.g. the number of ports that are currently being used to connect clients to provider network 118.

In the example depicted in FIG. 1, requestor 114 is submitting a connectivity request 108 to connectivity coordinator 104 requesting a dedicated physical connection between client network 116 and provider network 118. The connectivity request may include a physical location of client network 116, a desired bandwidth capacity of the dedicated physical connection, network equipment information relating to network equipment of client network 116, and other related information. For example, the connectivity request may specify if a fiber optic connection is requested or a copper wire connection, or other like network equipment related specifications. Connectivity request 108 may include a budget of requestor 114 for a dedicated physical connection between client network 116 and provider network 118. Connectivity request 108 may also include filtering parameters. For example, connectivity request 108 may specify only return connection capacity groups within a certain distance of client network 116, for example only return connection capacity groups located within 100 miles of a location of client network 116 specified in connectivity request 108. In some embodiment connectivity request 108 may include filter parameters that include only returning available connection capacity groups that are within a budget specified in connectivity request 108. In some embodiments, other filter parameters may be included in a connectivity request.

In response to receiving connectivity request 108, connectivity coordinator 104 may determine respective capacities for connection capacity groups with ports available to accept a dedicated physical connection from client network 116 such as connection capacity group 126 and connection capacity group 128. In FIG. 1, two connection capacity groups are illustrated. In some embodiments provider network 118 may include more or less connection capacity groups. In order to determine respective capacities for connection capacity groups with ports available to accept a dedicated physical connection, connectivity coordinator 104 may obtain capacity information for connection capacity groups from connection capacity database 102. Connectivity coordinator 104 may also use information included in connectivity request 108 to determine which connection capacity groups comprise ports available to accept a dedicated physical connection from client network 116 to provider network 118. For example, the connectivity request may specify a location of client network 116 and a desired port type. Connectivity coordinator 104 may obtain capacity information from connection capacity database 102 for connection capacity groups within a set distance of the location of the client network specified in connectivity request 108 that comprise ports that match the port type requested in connectivity request 108. For example, connectivity coordinator 104 may determine that connection capacity group 126 and connection capacity group 128 are within the set distance of client network 116 and include available ports of the type specified by requestor 114 in connectivity request 108. Connectivity coordinator 104 may use information obtained from connection capacity database 102 to determine that connection capacity group 120 has three available ports 130 and that connection capacity group 128 has five available ports 134.

Connectivity coordinator 104 may determine bias response information for available ports 130 at connection capacity group 126 and for available ports 134 at connection capacity group 128 by applying the determined capacities for connection capacity group 126 and connection capacity group 128 to capacity bias model 106. In some embodiments, capacity bias model 106 may comprise a function that describes an inverse relationship between a number of available ports at a connection capacity group and a price charged to a client for use of a port at the connection capacity group. Each connection capacity group, such as connection capacity groups 126 and 128 may have separate prices that are based on the number of ports available at each respective connection capacity group at a moment in time. For example, connection capacity group 128 has more available ports 134 than connection capacity group 126, therefore capacity bias model 106 may be used to determine a price for connecting to a port of connection capacity group 128 that is lower than a price for connecting to a port of connection capacity group 126. In some embodiments, a particular connection capacity group may have different prices for different types of ports based on the number of available ports of a particular type of port available at a particular point in time. In some embodiments, capacity bias model 106 may be customized for particular clients. For example, a client that conducts a significant amount of business with provider network 118 may be charged a different price than a first time customer of provider network 118 even though both customers are selecting the same type of port at the same connection capacity group.

Connectivity coordinator 104 may send bias response information 110 to requestor 114 that includes bias response information determined based on the determined capacities of connection capacity group 126 and connection capacity group 128 and based on capacity bias model 106. Requestor 114 may view the bias response information 110 via a well-known interface, for example via a webpage. Requestor 114 may select connection capacity group 128 based on the bias response information 110. For example, because connection capacity group 128 comprises a larger number of available ports to accept a dedicated physical connection from client network 116 than connection capacity group 126, bias response information 110 may include a lower price for a dedicated physical connection to connection capacity group 128 that a price offered for a dedicated physical connection to connection capacity group 126. Requestor 114 may select connection capacity group 128 because the price offered for connection capacity group 128 is lower than the price offered for connection capacity group 126 and communicate the selection to connectivity coordinator 104 via client selection 112. In response to client selection 112, connectivity coordinator 104 may provide information to personnel of data center 122 instructing the personnel to establish a dedicated physical connection 124 between client network 116 and connection capacity group 128. Connectivity coordinator 104 may update connection capacity database 102 to reflect the reduced number of ports available at connection capacity group 128 caused by requestor 114 selecting one of the five available ports 134 for a dedicated physical connection from client network 116 to provider network 118.

Figure 2:
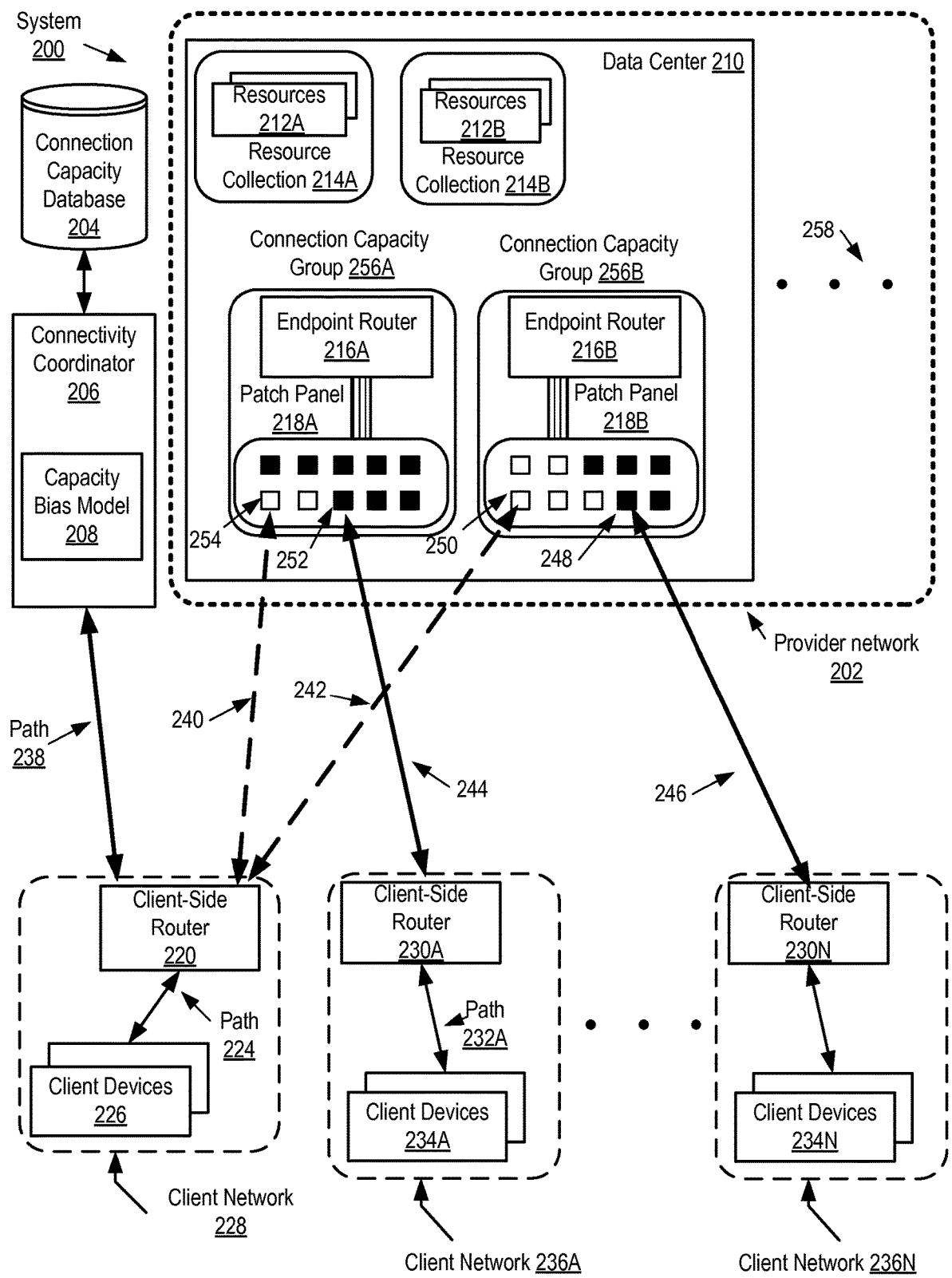
FIG. 2 is a block diagram of a provider network that includes multiple connection capacity groups that accept dedicated physical connections from multiple client networks, according to some embodiments.

FIG. 2 is a block diagram of a provider network that includes multiple connection capacity groups that accept dedicated physical connections from multiple client networks, according to some embodiments. Connectivity coordinator 206, capacity bias model 208, and connection capacity database 204 may function in the same manner as connectivity coordinator 104, capacity bias model 106, and connection capacity database 102 described in regard to FIG. 1. FIG. 2 illustrates an example system environment, according to at least some embodiments. The system 200 may include a provider network 202 with one or more data centers 210 maintained to provide services to clients, such as cloud computing services or cloud storage services. The data centers 210 in turn may include resource collections such as 214A and 214B. Each resource collection 214 may include a set of resources (for example, computer servers, storage devices, network devices, etc.) such as resources 212A in resource collection 214A and resources 212B in resource collection 214B. The system 200 may also include a connectivity coordinator 206 configured to provide a connectivity service to clients similar to the connectivity service describe in regard to connectivity coordinator 104 in FIG. 1. The system 200 may also include connection capacity database 204, and a plurality of connection capacity groups such as connection capacity groups 256A and 256B. Each connection capacity group may include an endpoint router coupled to a patch panel that comprises a certain number of physical ports configured to accept dedicated physical connections to client networks, such as connection capacity groups 256A and 256B that include endpoint routers 216A and 216B that are respectively coupled to patch panels 218A and 218B.

In some embodiments a connection capacity group, such as connection capacity group 256A may comprise multiple endpoint routers 216A and multiple patch panels 218A that are collectively grouped together to form a single connection capacity group at a data center such as data center 210. In some embodiments, a connection capacity group such as connection capacity group 256A may comprise multiple endpoint routers 216A of different types. For example, a first endpoint router 216A may be configured to accept 10-gigabyte connections and a second endpoint router 216A also in connection capacity group 256A may be configured to accept 1-gigabyte connections. The available ports 254 and unavailable ports 252 of connection capacity group 256A may comprise ports of different types that are associated with the different types of endpoint routers, for example available ports 254 may comprise available 10-gigabyte connection ports and available 1-gigabyte connection ports that are connected to 10-gigabyte connections of the first endpoint router and 1-gigabyte connections that are connected to 1-gigabyte connections of the second endpoint router. Similarly, unavailable ports 252 may comprise 10-gigabyte ports and 1-gigabyte ports that are currently being used to provide dedicated physical connections to clients via different types of endpoint routers. In some embodiments a connection capacity group 256A may include other types of different ports, including ports with bandwidth capacities other than 1-gigabyte and 10-gigabyte. In some embodiments, connection capacity groups, such as connection capacity group 256A may include ports of different types other than varying bandwidths. For example, a connection capacity group may comprise some port types that accept a fiber optic connection and other port types that accept a copper cable connection. In some embodiments other types of ports may be included in a connection capacity group.

The ports of a patch panel may be linked to one or more endpoint routers so that a dedicated physical connection to a port of a patch panel of a particular connection capacity group connects the client network connected to the port to an endpoint router of the connection capacity group associated with the particular port of the particular patch panel. For example, available ports 254 of patch panel 218A may be connected to endpoint router 216A so that if client network 228 selects to connect to provider network 202 via possible connection 240, client network 228 will be connected to endpoint router 216A via port 254 of patch panel 218A that is connected to endpoint router 216A.

The endpoint routers 216 may be linked to the resource collections 214 via private network paths included in provider network 202. Direct use of a private network may be limited to devices and servers of the provider network, i.e., a network packet may only be physically transmitted upon a link of a private network path from a device owned or managed by the owner of the provider network. The term "path" as used herein, broadly refers to the set of links and devices traversed by a network message or packet between a source device and a destination device. The set of links of a given path may, in some cases, comprise a single wire, as when the source and destination may be linked directly by a physical cable. In other cases the path may include multiple wired and/or wireless links and several intermediary devices such as switches, gateways, routers and the like. Paths may comprise unidirectional and/or bidirectional physical links.

In the illustrated embodiment, client network 228 is shown requesting a dedicated physical connection to provider network 202 over path 238 (e.g. the internet) and multiple client networks 236A through 236N are shown connected to provider network 202. In FIG. 2 client networks 236A and 236N are separated by ellipses to indicate any number of client networks 236 can be connected to provider network 202. In FIG. 2 a single data center 210 is illustrated, however ellipses 258 are illustrated to indicate that provider network 202 may include multiple data centers 210. Each client network comprises a plurality of client devices 226 and 234 (e.g., 226, 234A and 234N) from which requests that are ultimately serviced at resource collections 214 may be generated. Such client devices 226 and 234 may include a variety of systems such as desktop or racked computer systems, laptops, notebooks, tablets, smart phones and the like. Some client devices 226 and 234 may be housed at client data office premises, client data centers, or client home premises in various embodiments, and others may be mobile devices with no fixed physical location. In the illustrated environment, the client devices 226 and 234 of a particular client have access to a client-side router—e.g., client devices 234A of client network 236A are connected to client-side router 230A via path 232A, and client devices 226 of client network 228 are connected to client-side router 220 via path 224.

Client-side routers 230A-N in the example shown in FIG. 2 are connected to provider network 202 via dedicated physical connections to ports in connection capacity groups of provider network 202 (e.g. client-side router 230A is connected to connection capacity group 256A at port 252 of patch panel 218A, and client-side router 230N is connected to connection capacity group 256B at port 248 of patch panel 218B).

In general, a number of different types of paths to various components of data center 210, such as connectivity coordinator 206 and resource collections 212, may be available from client networks 230 in various embodiments. For example, a path 238 that does not include endpoint routers 216 is shown in FIG. 2 between client devices 226 of client network 228 and connectivity coordinator 206; such a path 238 may include various routers, gateways and devices of the public Internet, for example, which may or may not provide desired levels of performance, availability, reliability or other service characteristics required for some of the services provided by the provider network 202. Other paths similar to 238, but not illustrated in FIG. 2, may also be available to the resource collections 212 from client devices 226 and/or 234.

A connectivity service provided by connectivity coordinator 206 may include a number of techniques implemented to help clients of the provider network establish and manage dedicated physical connections from the client networks 228 and 236 to the resource collections 212 in various embodiments. For example, dedicated physical connections 244 and 246 may include a physical link or cable between client-side router 230A and patch panel 218A, and a physical link or cable between client-side router 230N and patch panel 218B. The term dedicated physical connection, as used herein, refers to a physical network connection set up between two autonomous networks. For example, within the Internet, an autonomous network may be identified by a unique Autonomous System (AS) identifier—a collection of connected Internet Protocol (IP) routing prefixes under the control of one or more network operators that presents a common, clearly defined routing policy to the Internet. In the illustrated embodiment, the connectivity coordinator 206 may be operable to implement an interface defining various connectivity operations available to clients, including establishment of dedicated physical connections such as connections 240 and 242. The interface may be implemented using a variety of approaches: e.g., as an application programming interface (API), a web-based interface, other graphical user interfaces, or command-line interfaces, in different embodiments. Connectivity coordinator 206 may also make the interface known to clients using various mechanisms—e.g., a notification detailing the interface may be published on one or more corporate web sites in one embodiment. Connectivity coordinator 206 may itself be resident outside provider network 202 in some embodiments, and in other embodiments it may be incorporated within the provider network 202.

Using the interface implemented by connectivity coordinator 206, a client may generate a request for dedicated connectivity. The client may, by making such a request, wish to indicate that a physical network link (similar to dedicated physical connections 244 and 246 shown in FIG. 2) be established exclusively for a client network 228 to communicate with one or more resource pools 212, for any of a number of reasons such as better performance, higher reliability, enhanced security, or lower or more predictable cost. The request may provide any combination of a number of different details that may be of use to connectivity provider 206 in various embodiments—for example, the physical location of one or more client-side routers that could be used, a desired bandwidth and, or other service requirements. In some implementations specific service requirements may be provided in subsequent requests after the initial request to establish dedicated physical connectivity has been sent.

In response to receiving such a request, connectivity coordinator 206 may determine a respective capacity for connection capacity groups available to accept a dedicated physical connection. For example, in FIG. 2, the dashed lines 240 and 242 represent a possible link from client side router 220 to available port 254 of connection capacity group 256A and a possible link from client-side router 220 to available port 250 of connection capacity group 256B. The connectivity coordinator may determine a capacity for each connection capacity group available to accept a dedicated physical connection from client network 228 based on capacity information stored in connection capacity database 204. For example capacity information from connection capacity database 204 may indicate patch panel 218A of connection capacity group 256A includes two available ports 254. And, patch panel 218B of connection capacity group 256B includes five available ports 250. Connectivity coordinator 206 may determine bias response information based on the determined capacities for each respective connection capacity group and capacity bias model 208. For example, capacity bias model 208 may indicate bias response information for a connection to connection capacity group 256A that indicates a higher price for a connection to connection capacity group 256A than a price for a connection to connection capacity group 256B because connection capacity group 256A has a higher capacity to accept dedicated physical connections.

A client may then select a connection capacity group with which the client would like to establish a dedicated physical connection from the client network to the provider network. For example, the client of client network 228 may select to connect client-side router 220 to available port 250 at connection capacity group 256B because bias response information indicated a lower price for a dedicated physical connection to connection capacity group 256B than a price for a dedicated physical connection to connection capacity group 256A. Having received the selection indicating the selected connection capacity group to provide the dedicated connectivity, the connectivity coordinator 206 may generate a reply or notification comprising configuration instructions for a physical network link to be established to the target endpoint router 216B of connection capacity group 256B to provide at least a portion of the desired dedicated connectivity. The instructions may include a variety of elements in various embodiments, including for example a port number, rack identifier and the like to identify the target endpoint router. The instructions may also be generated in accordance with the interface—for example, as the contents of a web page in an implementation where the request was received as a web-based form submission. In some cases multiple responses may be sent by the connectivity coordinator—for example, a combination of one or more web responses to the requester, and one or more email messages, some of which may be sent to entities other than the client, such as the operator of the provider network 202. The response or responses from the connectivity coordinator 206 may be used to set up the physical link needed. The time taken to establish the physical link may vary widely, depending on the responsiveness of the client, the responsiveness of the operator of the provider network 202, and various procedures that may have to be completed for security, authorization and the like. After the physical network link has been set up, the connectivity coordinator 206 may in some embodiments transmit a confirmation message to the client indicating that the desired dedicated connectivity has been established. Various connectivity related information, including for example data identifying details of physical links such as data identifying the clients for which such links have been established, the dates or times of establishment of dedicated connectivity, and the like, may be stored in connection capacity database 204 in some embodiments.

In some embodiments, a connection capacity group may comprise different types of ports as described above. Connectivity coordinator 206 may determine separate capacities for different types of ports at each connection capacity group. For example, connectivity coordinator 206 may determine a capacity of 10-gigabyte ports at connection capacity group 256A and a capacity of 1-gigabyte ports at connection capacity group 256A. In some embodiments connectivity coordinator 206 may determine capacities for other types of ports or combinations of types of ports at a connection capacity group. For example, connectivity coordinator 206 may determine separate capacities for 10-gigabyte fiber optic ports, 1-gigabyte fiber optic ports, and 1-gigabyte copper wire ports at a connection capacity group, such as connection capacity group 256A. In some embodiments other types and/or combinations of types of ports may be grouped together and capacities may be determined for the other groupings by connectivity coordinator 206.

In some embodiments, connectivity coordinator 206 may use determined capacities for different types of ports or combinations of types of ports to generate different bias response information for each different type or combination of different type of ports based on capacity bias model 208. For example, connectivity coordinator 208 may determine a different price for 10-gigabyte ports and 1-gigabyte ports in the same connection capacity group based on different capacities of 10-gigabyte ports and 1-giabyte ports in the particular connection capacity group. For example, the five available ports 250 of connection capacity group 256B may include four 1-gigabyte ports and one 10-gigabyte port. While, the two available ports 254 of connection capacity group 256A may both be 10-gigabyte ports. Connectivity coordinator 206 may provide bias response information to a client requesting a 10-gigabyte port that offers a lower price for connecting to connection capacity group 256A than connection capacity group 256B because connection capacity group 256A has a capacity of two for 10-gigabyte ports and connection capacity group 256B has a capacity of one for 10-giabyte ports, even though connection capacity group 256B has an overall number of available ports 250 that is greater than the overall number of available ports 254 of connection capacity group 256A. The bias response information may influence a client to select a connection to connection capacity group 256A, thus balancing the supply of available 10-gigabyte ports between connection capacity group 256A and connection capacity group 256B (after the client selection both connection capacity group 256A and 256B would have one available 10-gigabyte port).

In addition to the network paths illustrated in FIG. 2, in many environments there may be several other alternative network paths available between the client networks 228 and 236 and various components of the system 200. For example, some connectivity requests may be transmitted to the connectivity provider 206 over a path that includes public or shared links, and various services provided at resource collections 212 may be accessed over public or shared links as well. In some cases the alternative paths may serve as backups in case connectivity over the desired dedicated paths is interrupted.

Please note that previous descriptions are not intended to be limiting, but are merely provided as an example of provider networks, client networks, dedicated physical connections, resources, and routers. The number or arrangement of components, such as the number or arrangement of ports and routers may be implemented in many different ways.

Figure 3:
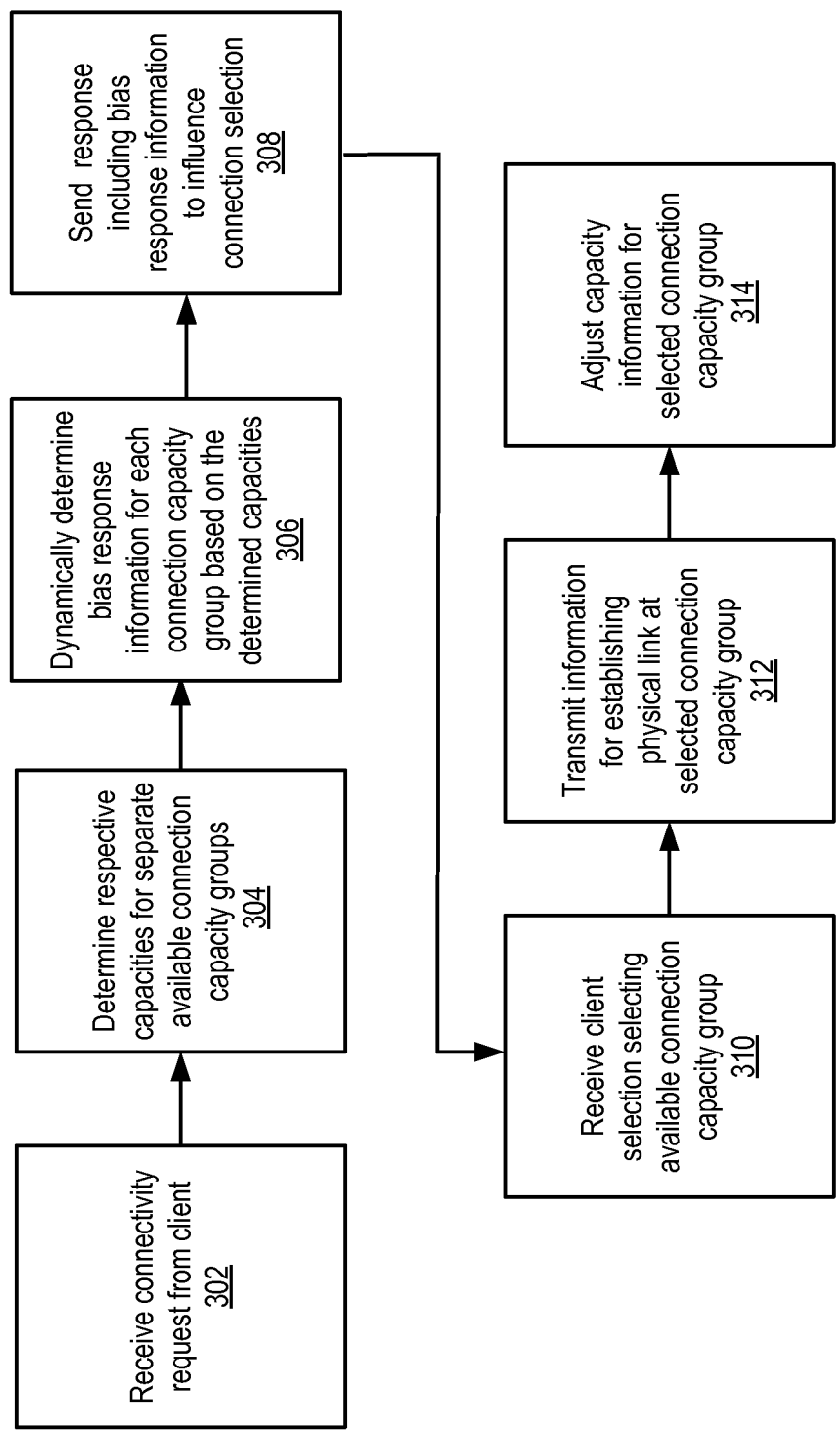
FIG. 3 is a flow diagram for requesting and selecting a dedicated physical connection from a client network to a provider network, according to some embodiments.

FIG. 3 is a flow diagram for requesting and selecting a dedicated physical connection from a client network to a provider network, according to some embodiments.

The steps illustrated in FIG. 3 may be implemented by connectivity coordinator 104 of FIG. 1 or connectivity coordinator 206 of FIG. 2 or by other components described in this specification.

At step 302, a connectivity request is received from a client. The connectivity request may specify a location of a client network, a desired bandwidth for a requested dedicated physical connection to a provider network, a desired port type, such as a fiber optic port or a copper wire based port. The connectivity request may also include other network equipment specification information. In addition, the connectivity request may include a desired budget for the requested dedicated physical connection. For example, a client may specify only show connection options that do not exceed a certain price per hour, etc. The connectivity request may also include one or more filter parameters. For example, the connectivity request may specify only display 10-gigabyte connection options or may specify only display fiber optic connection options.

At step 304, the connectivity coordinator determines respective capacities for separate available connection capacity groups that are available to accept a dedicated physical connection from the client network for which the request was made. The connectivity coordinator may receive connection capacity information from a connection capacity database communicatively coupled to the connectivity coordinator in order to determine the respective capacities of connection capacity groups available to accept the dedicated physical connection. In some embodiments, a connection capacity database may be included in a connectivity coordinator. In some embodiments, a connection capacity database may be implemented separate from a connectivity coordinator. A connectivity coordinator may use information included in the connectivity request along with capacity information from a connection capacity database to determine the connection capacity groups available to accept a dedicate physical connection to a particular client network. For example, the connectivity coordinator may use a geographic location of the client network and desired connection bandwidth when determining available connection capacity groups to accept a dedicated physical connection. The connectivity coordinator may determine that only connection capacity groups within a certain distance of the geographic location of the client network are available to accept dedicated physical connections. The connectivity coordinator may determine that only connection capacity groups that comprise available ports matching a desired network bandwidth specified in the connectivity request are available connection capacity groups.

In some embodiments, the connectivity coordinator may use other criteria to determine which connection capacity groups of a provider network are connection capacity groups available to accept a dedicated physical connection to the client network. Other criteria may include, a specific port type (such as copper, fiber optic, etc.), a client specified budget, other network parameters, and the like.

After determining the available connection capacity groups for the requested dedicated physical connection from the client network to the provider network, the connectivity coordinator may determine a capacity to accept the dedicated physical connection at each respective available connection capacity group. To determine the capacity, the connectivity coordinator may use the capacity information stored in a connection capacity database. For example, the connectivity coordinator may use the capacity information from a connection capacity database to determine a number of available ports of the desired type at each available connection capacity group. In some embodiments, the connectivity coordinator may determine the capacities of connection capacity groups that comprise similar types of ports to the types of ports requested in the connectivity request, even though the connection capacity groups do not comprise ports that exactly meet the requested port type. For example, a client request may specify a desired port type of a port configured to accept a 1-gigabyte fiber optic connection. A particular connection capacity group may not comprise any 1-gigabyte fiber optic ports, but may have a large number of 10-gigabyte fiber optic ports. The connectivity coordinator may determine the capacity of the connection capacity group with the large number of 10-gigabyte fiber optic ports to be included in a response to the client, even though the connection capacity group does not comprise any 1-gigabyte fiber optic ports as specified in a connectivity request.

In some embodiments, the capacities of the available connection capacity groups may be determined based on a current number of ports available at each respective available connection capacity group. In some embodiments, the capacities of the available connection capacity groups may be determined based on projected capacities. The projected capacities may be based on usage trends for a certain connection capacity group or usage trends in a certain location. In some embodiments, the projected capacities may take into account planned expansion projects. For example, the projected capacities may include anticipated capacities due to expansion projects in which additional endpoint routers, patch panels, and associated ports will be added to a particular connection capacity group. Also, in some embodiments, projected capacities may take into account projected future sales. For example, a client of a provider network may be in negotiations for a contract for a large number of dedicated physical connection in a particular location. The projected capacities may take into account the reduced capacity at the particular connection capacity group that would be caused by the client reserving the large number of ports at the particular connection capacity group. In some embodiments, the projected capacities may take into account projected maintenance or upgrade projects at a particular connection capacity group that would reduce the capacity of the particular connection capacity group for a projected amount of time. For example, power infrastructure associated with a particular connection capacity group may need to be upgraded. The upgrade of the power infrastructure may be anticipated to take two weeks. The projected capacity for the particular connection capacity group may reduce the projected capacity of the particular connection capacity group during the two week period while the power systems at the particular connection capacity group are being upgraded. The reduced capacity for the two-week duration of the upgrade project may be included in the projected capacity for the particular connection capacity group.

At step 306, the connectivity coordinator may dynamically determine respective bias response information for each available connection capacity group based on the capacities determined at step 304 and based on a capacity bias model. A capacity bias model may define an inverse relationship between a number of available ports of a particular type at a particular connection capacity group and a price charged to clients to establish a new connection to one of the available ports at the particular connection capacity group. For example, the relationship between capacity and price may be a linear relationship so that as the number of available ports decreases, the prices charged to a client to connect to one of the remaining available ports goes up. In some embodiments, the relationship between capacity and price may be exponential so that as the number of ports goes down the price charged per port goes up exponentially. In some embodiments, bias response information may be determined specific to a particular client. For example, a large client that conducts a high volume of business with the provider network may be charged a different price for a dedicated physical connection to the provider network than a smaller client given the same location and capacities. In some embodiments, a client that operates an enterprise network that spans a large geographic area and therefore has the capability to connect to connection capacity groups that are geographically separated may receive different bias response information than a client that has a client network that is located in a single geographic location. For example, the client that operates the enterprise network that spans a large geographic area may receive bias response information that indicates a greater price at connection capacity groups that have a limited capacity than a price offered to a small customer that only has a client network limited to a single geographic area near the connection capacity group with the limited availability. The relationship between capacity and price included in the capacity bias model is discussed in more detail below in regard to FIGS. 4A-C.

At step 308, the connectivity coordinator sends a response to the requestor requesting the dedicated physical connection between the provider network and a client network. The response may include the bias response information determined for each available connection capacity group. The response may be sent in accordance with a user interface presented to the requestor to allow the requestor to view the bias response information and make a selection.

At step 310, the connectivity coordinator receives a client selection indicating a desired connection capacity group with which the client would like to establish a dedicated physical connection.

At step 312, the connectivity coordinator transmits information for establishing the physical link at the selected connection capacity group. The information may be sent to data center personnel at the location of the selected connection capacity group. The information may include a patch panel identification, a port identification, authorization information showing that the connection is authorized, and other necessary information. In some embodiments, data center personnel may receive the connection information and locate the physical port specified in the connection information. Data center personnel may physically connect the specified port to a link connected to the client network. In some embodiments, the connection from the client network to the provider network may be automated by one or more switches.

At step 314, the connectivity coordinator updates the connection capacity database to indicate the newly established dedicated physical connection and the reduction in the number of available ports at the selected available connection capacity group. In some embodiments, the connection capacity database may be updated to reflect the changed capacity at a particular connection capacity group when a port at the particular connection capacity group is reserved even before a client network is actually connected to the reserved port. In some embodiments, capacity information indicating reserved ports and actually connected ports may be kept in a connection capacity database for connection capacity groups of a provider network. In some embodiments, a connection capacity database may be part of a larger database of a provider network storing information related to capacities of the provider network. In some embodiments, the connection capacity database may be included as a part of the connectivity coordinator.

FIG. 4A is a graph of a capacity bias model based on a linear relationship between available connections and rate per connection, according to some embodiments. The relationship depicted in FIG. 4A between rate per connection and available connections at a particular connection capacity group may be included in capacity bias model 106 of FIG. 1 and capacity bias model 208 of FIG. 2 The relationship depicted in FIG. 4A may also be included in the capacity bias model discussed in regard to FIG. 3 and any other figure of this specification. Function 402 defines an inverse linear relationship between a price charged for a connection at a particular connection capacity group and a number of available ports to accept a connection at the particular connection capacity group. In some embodiments, the rate charged for a connection may be a price per unit of time connected via the connection. The function is bound on the low end by base rate 418 and on the upper end by max rate 416. In some embodiments, the relationship depicted in FIG. 4A is used to determine a rate for a new connection and is only applied to a rate charged to an existing customer for an existing connection if the result would lower the rate charged to the existing customer. In some embodiments, the rate charged to an existing customer for an existing connection may match the rate being charged for a new connection within a range.

FIG. 4B is a graph of a bias model based on an exponential relationship between available connections and rate per connection, according to some embodiments. The relationship depicted in FIG. 4B between a rate per connection and available connections at a particular connection capacity group may be included in capacity bias model 106 of FIG. 1 and capacity bias model 208 of FIG. 2 The relationship depicted in FIG. 4B may also be included in the capacity bias model discussed in regard to FIG. 3 and any other figure of this specification. The relationship 404 described in FIG. 4B may be used in a similar manner as the relationship 402 described in FIG. 4A. In FIG. 4B, an inverse exponential relationship defines a rate charged to clients to establish a new dedicated physical connection. In some embodiments, the rate charged may be a price per unit of time connected to via the connection. The relationship 404 is bound on the upper end by max rate 420 and on the lower end by base rate 422. In a similar manner as relationship 402 of FIG. 4A, in some embodiments relationship 404 may only apply to new connections or may be used to lower a price charged to existing customers for an existing connection. In some embodiments a price charged to existing customers for existing connections may vary according to relationship 404 within a range, such as between max rate 420 and based rate 422. In some embodiments, a price charged to an existing customer for an existing connection may only be lowered to due changes in capacity at a particular connection capacity group.

FIG. 4C is a graph of a rate per connection for a connection capacity group over time, according to some embodiments. In some embodiments the rate may be a price charged per connection for a unit of time connected. Line 406 depicts a price charged at a particular connection capacity group over time in response to changes in capacity at the particular connection capacity group. For example, at 412, the price per connection drops to base rate 410, this could be in response to a large client terminating connection reservations. In another example, the drop in price at 412 could be caused by an expansion project that added a significant quantity of additional available ports at the particular connection capacity group. The drop in price at 412 could be caused by other situations. At 414, the price per connection is limited by max rate 408. For example, a large customer could have reserved a large quantity of connections at 414 and the price may have stayed at the max rate until a project could be completed to add additional port capacity at the particular connection capacity group. In another example, the price at 414 could be high due to a limited capacity of ports caused by a scheduled maintenance operation or upgrade project. The increase in price at 414 could also be caused by other situations.

Figure 5:
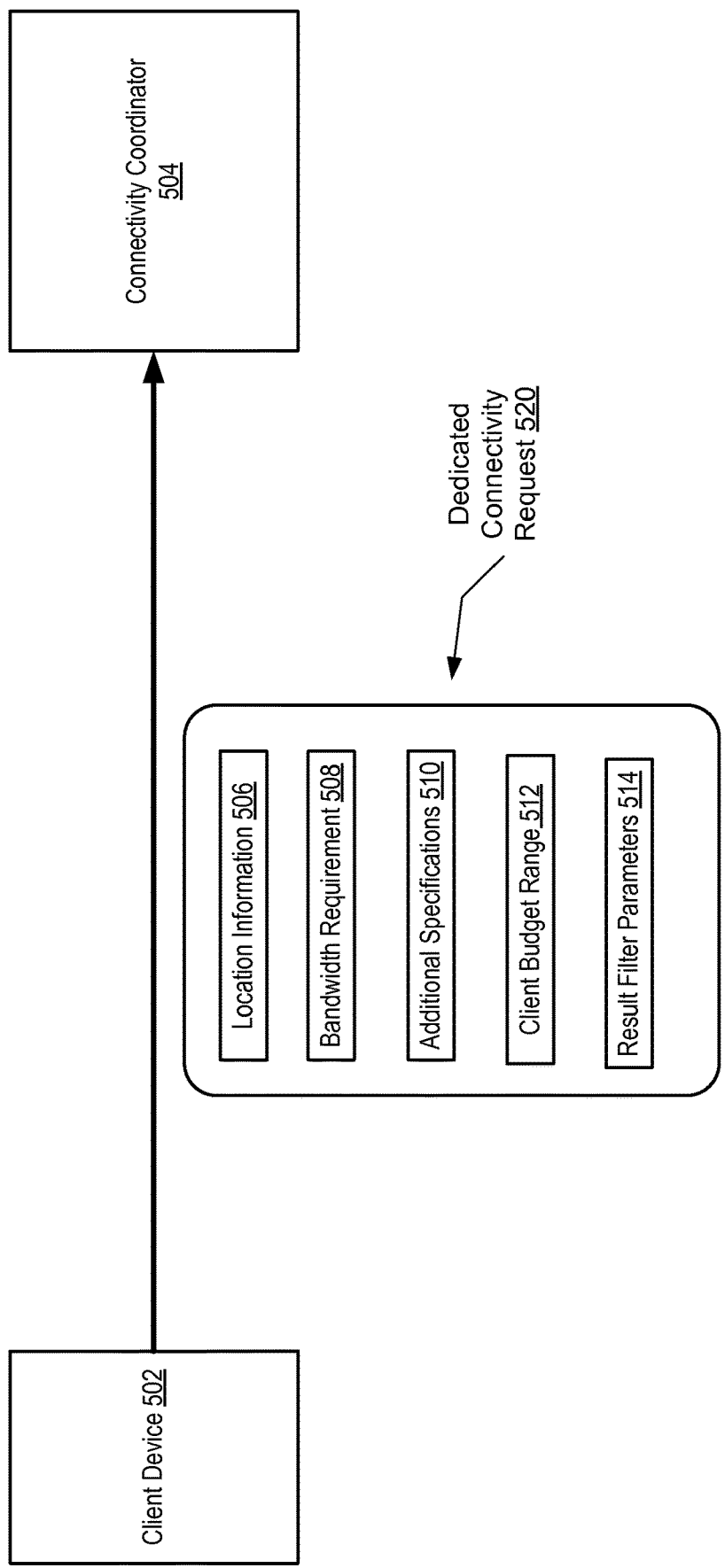
FIG. 5 is a diagram illustrating a connectivity request for a dedicated physical connection being sent from a client device to a connectivity coordinator, according to some embodiments.

FIG. 5 is a diagram illustrating a dedicated connectivity request being sent from a client device to a connectivity coordinator, according to some embodiments. Client device 502 may be a requestor 114 depicted in FIG. 1. In some embodiments, client device 502 may be part of a client network. Client device 502 sends dedicated connectivity request to connectivity coordinator 504. Dedicated connectivity request 520 may be connectivity request 108 described in FIG. 1 or any other connectivity request described in FIGS. 1-9. Dedicated connectivity request 520 includes location information 506 describing the location of the client network requesting a dedicated physical connection to the provider network. Dedicated connectivity request 520 also includes a client specified bandwidth requirement 508 and additional specifications 512. In some embodiments, additional specification 512 may include a particular type of endpoint router hardware or software with which the client would like to establish the dedicated physical connection. In some embodiments, other specifications related to the requested dedicated physical connection may be included in additional specifications 512. A client may specify budget information in client budget range 514. For example, a client may specify a maximum price per connection the client is willing to pay. In some embodiments, a client may specify other budget constraints. A client may also include result filter parameters 515 in dedicated connectivity request 520. For example, the customer may specify to filter the available connection capacity groups and to only include available connection capacity groups within a certain price in a response to the dedicated connectivity request. In another example, a client may specify to filter the available connection capacity groups and only include available connection capacity groups that support a bandwidth speed greater than a certain value. In some embodiments, a client may specify to filter results included in a response to dedicated connectivity request 520 based on any of the other parameters discussed above. Not all these elements (506, 508, 510, 512, and 514) may be included in a connectivity request; any combination or subset of these and other elements may be included in a request in various embodiments.

Figure 6:
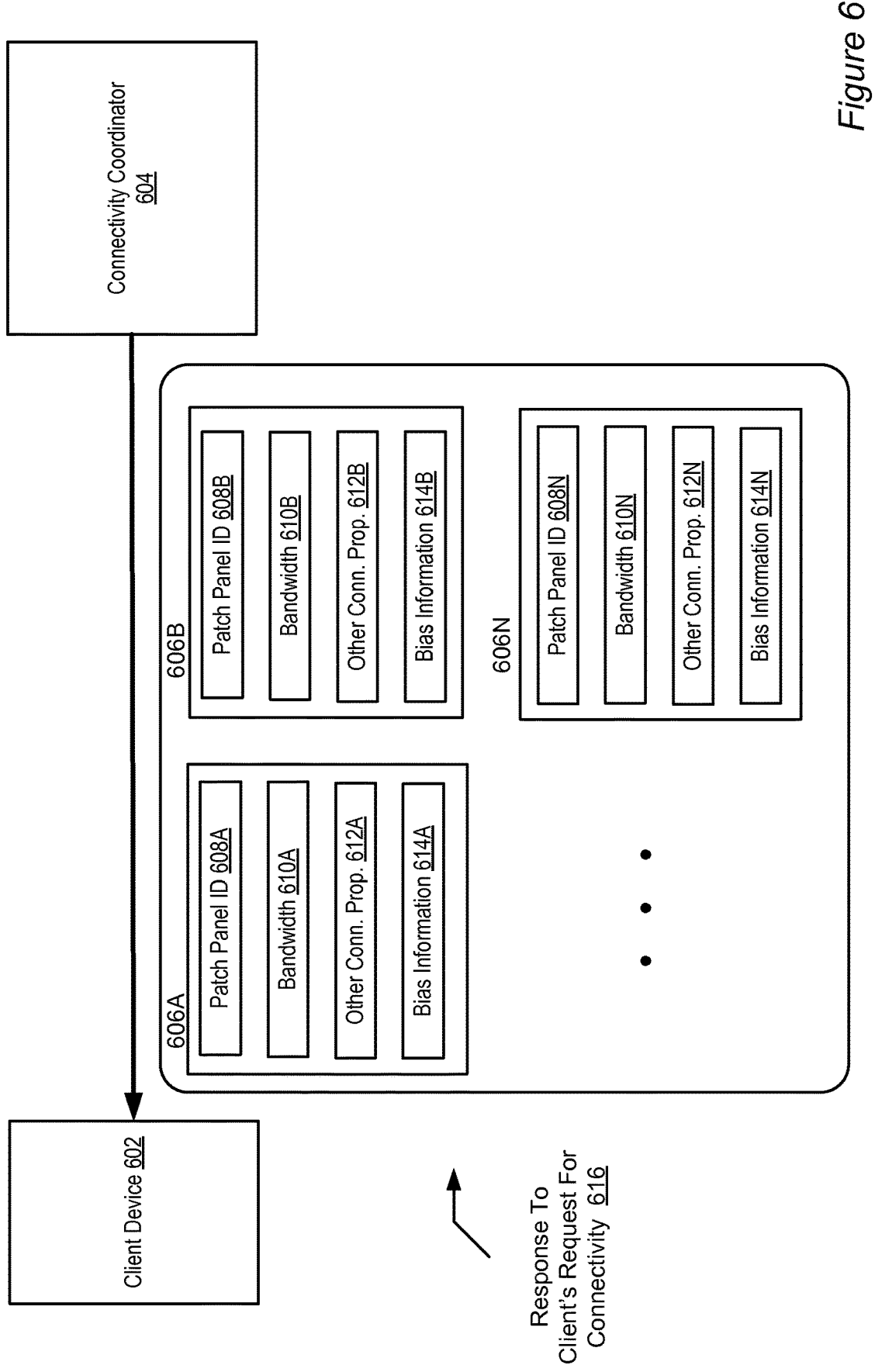
FIG. 6 is a diagram illustrating a response to a connectivity request being sent from a connectivity coordinator to a client device, according to some embodiments.

FIG. 6 is a diagram illustrating a response to a connectivity request being sent from a connectivity coordinator to a client device, according to some embodiments. Response 616 to client's request for connectivity may be sent to a requestor in response to the dedicated connectivity request 520 described in FIG. 5. Response 616 to client's request for connectivity may also include bias response information for available connection capacity groups 110 described in FIG. 1. Response 616 to client's request for connectivity may illustrate any of the responses to a client's request for connectivity described in FIGS. 1-10. Connectivity coordinator 604 sends response 616 to client's request for connectivity to client device 602. Response 616 includes responses 606A, 606B, up to 606N where "N" represents a number of available connection capacity groups identified in response to a connectivity request. In some embodiments more or less connection capacity groups may be included in response 616. Available connection capacity groups 606A, 606B through 606N include patch panel ID 608 for an identified patch panel associated with the available connection capacity group. For example, patch panel ID 608 may indicate "Data Center 1 connection capacity group B." Available connection capacity groups 606A through 606N may also include bandwidth 610A that identifies a bandwidth capacity at a particular connection capacity group, for example, a 10-gigabyte bandwidth capacity. Available connection capacity groups 606A through 606N may also include other connection properties 612 which may include any of the information included in additional specifications 512 described in FIG. 5. Response 616 may include bias information 614 for each available connection capacity group 606A through 606N. Response 616 may include different bias response information 614 depending on the capacity at each respective available connection capacity group that is represented by 606A through 606N. For example the connection capacity group associated with 606A may have more capacity that the available connection capacity group associated with 606B. Continuing the example, bias information 614A may indicate a lower price for a dedicated physical connection than bias information 614B for the same type of port because the available connection capacity group associated with 606A has more capacity to accept a dedicated physical connection. In some embodiments, response 616 may include more or less information for connection capacity groups 606A through 606N.

Figure 7:
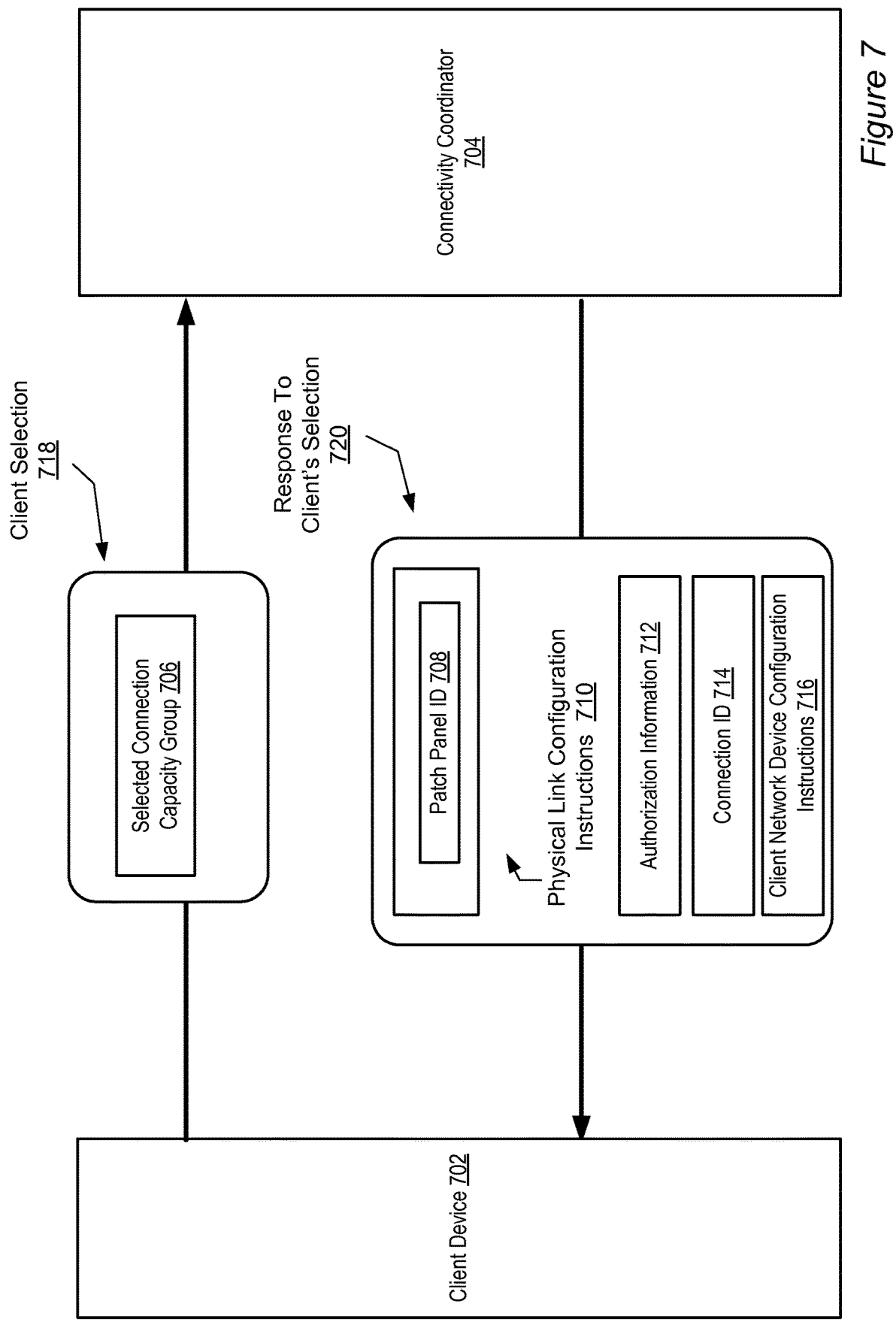
FIG. 7 is a diagram illustrating a client selection being sent from a client device to a connectivity coordinator and a response to the client's selection being sent from the connectivity coordinator to the client device, according to some embodiments.

FIG. 7 is a diagram illustrating a client selection being sent from a client device to a connectivity coordinator and a response to the client selection being sent from the connectivity coordinator to the client device, according to some embodiments. Client device 702 sends client selection 718 to connectivity coordinator 704 that includes a selected connection capacity group 706 from the set of available connection capacity groups included in response 616 of FIG. 6. In response to client selection 718, connectivity coordinator 704 sends response 720 to client's selection to client device 702. Response 720 includes physical link configuration instructions 710 including patch panel ID 708 that identifies the patch panel comprising the physical port with which the client will establish a dedicated physical connection. Response 720 also includes authorization information 712 showing that the client is authorized to connect at the selected connection capacity group and connection ID 714 identifying the selected dedicated physical connection. In some embodiments, response 720 may include client network device configuration instructions 716 to provide guidance to the client on how to configure the client's network device to establish the dedicated physical connection.

FIG. 8 is a diagram illustrating a graphical user interface for requesting a dedicated physical connection from a client network to a provider network, according to various embodiments. Interface 800 is an interface that allows a client to submit a request for a dedicated physical connection between a client network and a provider network. Interface 800 may be utilized to submit any of the connectivity requests described in FIGS. 1-8. Interface 800 includes welcoming information 802 orienting a user on how to interact with interface 800. In block 804 a user can enter address information indicating the location of the user's client network that is to be connected to the provider network. In block 806, a user can select a desired bandwidth for the desired dedicated physical connection from the client network to the provider network. FIG. 8 depicts an option between a 1-gigabyte connection, a 10-gigabyte connection or a user defined connection bandwidth. In some embodiments, other bandwidth speeds may be offered. In block 808 the user may provide information about the user's equipment that is to be connected to the provider network. For example, the user may provide a vendor name and model of the user's client-side router that is to be connected to the provider network. In some embodiments the client providing information about the client's equipment information 808 may be optional. At block 810, the client may specify a budget range for the desired dedicated physical connection. For example, the client may specify that the client is not willing to pay more than a certain amount for a dedicated physical connection. In some embodiments, the client may specify other budget constraints. At block 812 the client may click submit to send the connectivity request to a connectivity coordinator.

Figure 9:
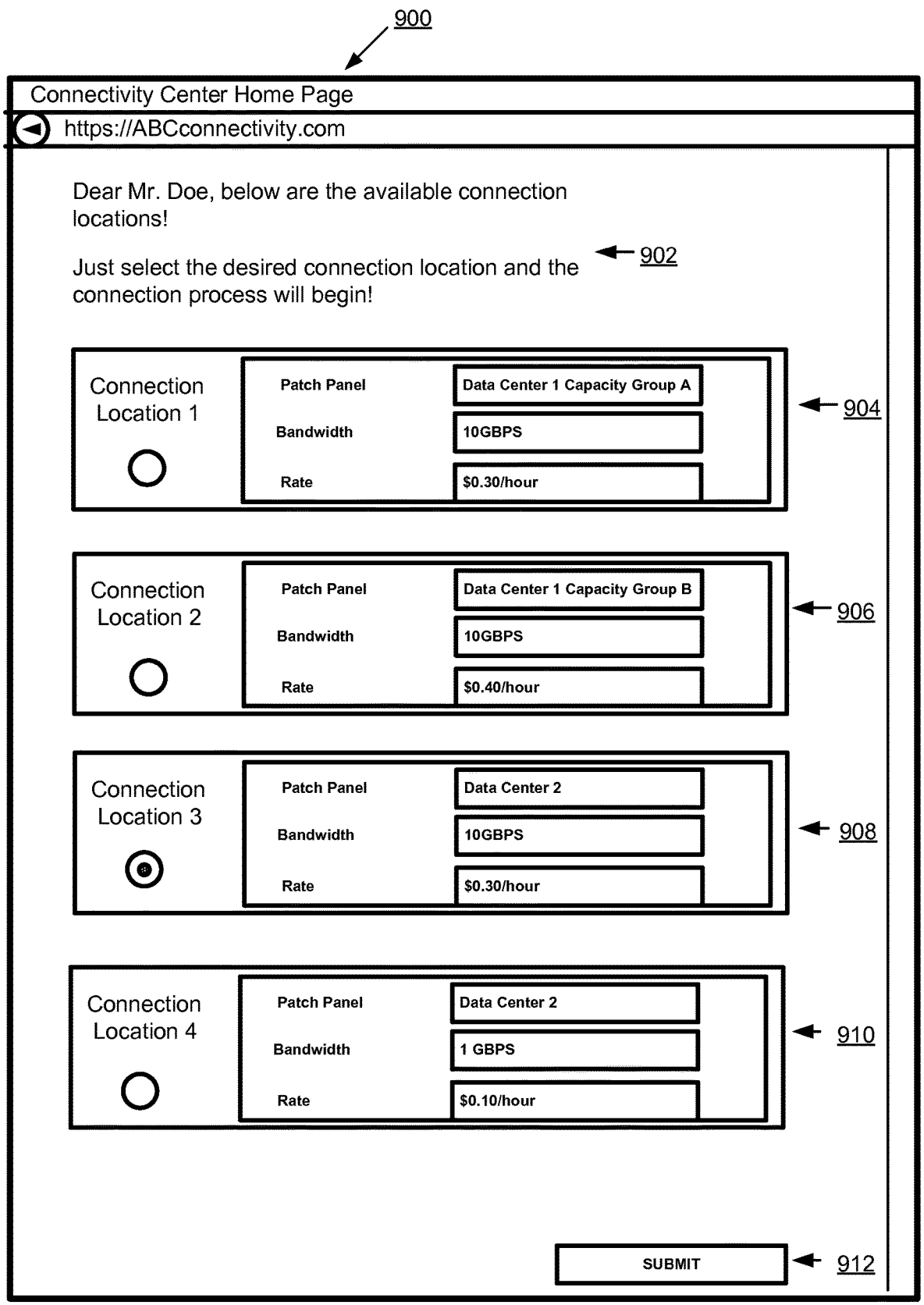
FIG. 9 is a diagram illustrating a graphical user interface for selecting a connection capacity group in response to a request for a dedicated physical connection from a client network to a provider network, according to some embodiments.

FIG. 9 is a diagram illustrating a graphical user interface for selecting a connection capacity group in response to a request for a dedicated physical connection from a client network to a provider network, according to some embodiments. A user may be displayed interface 900 in response to sending a connectivity request as described above in regard to FIG. 8. In some embodiments, a selection of a connection capacity group in response to a request for a dedicated physical connection from a client network to a provider network may be indicated by other means than a graphical user interface. For example, a selection may be indicated in a programmatic response, indicated via a command line interface, indicated via a Java Script Object Notation (JSON) data structure embedded in a HTTP response, or other like communication mechanisms. Interface 900 is generated to display information included in a response to a client's request for connectivity, such as response 616 described in FIG. 6. Interface 900 also displays bias response information included in a response 616 such as different prices for different connection capacity groups based on a determined capacity at each respective connection capacity group. Interface 900 includes instructions 902 instructing a user on how to select a connection location (connection capacity group). Blocks 904, 906, 908, and 910 respectively include bias response information for a connection capacity group at connection locations 1, 2, 3, and 4. As may be noted in the previous figure, FIG. 8, the user selected a 10-gigabyte connection. Therefore the connectivity coordinator has provided bias response information for connection locations 1, 2, and 3 that all comprise 10-gigabyte connections (blocks 904, 906, 908, and 910). In addition, the connectivity coordinator has provided bias response information for connection location 4 (block 910) that only comprises a 1-gigabyte connection. For example, connection location 4 may have a large number of available 1-gigabyte connections and the 10-gigabyte connections at connection locations 1-3 may be scarce. Therefore the bias response information included with connection location 4 (block 910) offers a considerable discount compared to the rates included in bias response information for connection locations 1-3 (blocks 904, 906, and 908). (e.g., connection location 4 is offered at $0.10/hour whereas connection locations 1-2 are offered at $0.30-$0.40/hour). The bias response information may influence the user to select connection location 4 (block 910) even though the user originally requested a 10-gigabyte connection. In another example, bias response information included with connection location 1 (block 904) indicates a rate of $0.30/hour and bias response information included with connection location 2 (block 906) indicates a rate of $0.40/hour. Connection location 1 (block 904) is located in Data Center 1 Group A and connection location 2 (block 906) is located in Data Center 1 Group B. The bias response information indicates a lower rate at connection location 1 which may influence a user to select connection location 1 over connection location 2 even though both connection locations are for 10-gigabyte ports in the same Data Center 1. For example, even though connection location 1 (block 904) and connection location 2 (block 906) are in the same data center, the connection capacity groups represented by connection location 1 and connection location 2 may be distinct. Block 908 indicates the user is selecting connection location 3 which offers 10-gigabyte connection for $0.30/hour at Data Center 2. In some embodiments, interface 900 may further use bias response information in a pop-up to influence the user's selection. For example, after selecting connection location 3 (block 908), a pop-up may appear that informs the user that the user could receive a significant discount if the user selected connection location 4 (block 910) instead of connection location 3. At block 912, the user may click submit to send the selection to the connectivity coordinator. As described above in some embodiments the user may receive a confirmation message confirming the reservation of the selected connection location.

Figure 10:
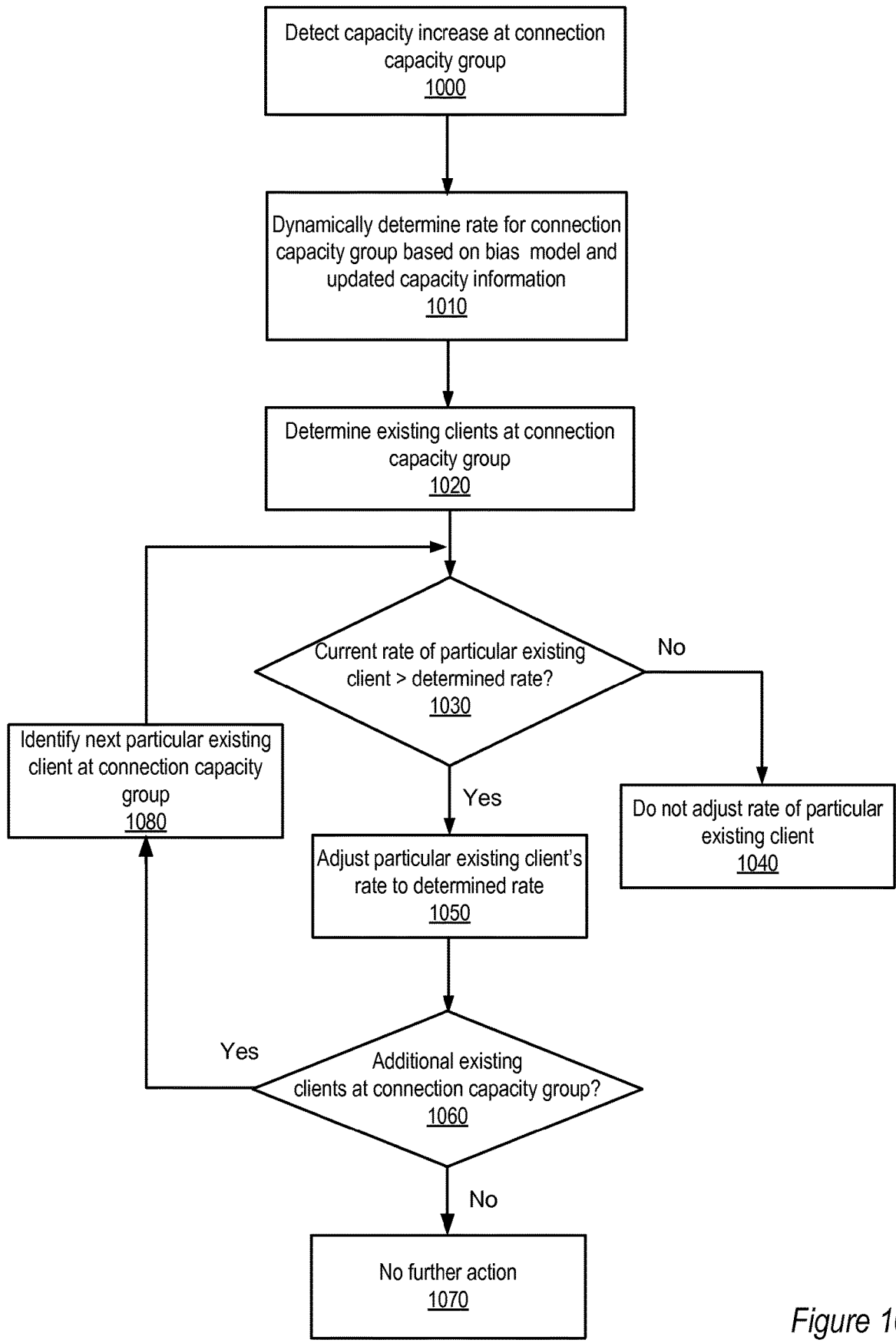
FIG. 10 is a high-level flow chart that illustrates adjusting a rate offered to existing customers of a particular connection capacity group based on detecting an increase in capacity at the particular connection capacity group, according to some embodiments.

FIG. 10 is a high-level flow chart that illustrates adjusting a rate offered to existing customers at a connection capacity group based on detecting an increase in capacity at a connection capacity group, according to some embodiments.

At step 1000 a capacity increase is detected for a particular connection capacity group. The capacity increase may be a result of existing dedicated physical connections being released or new capacity being added at a particular connection capacity group such as a new router and associated patch panel being installed. A connection capacity database may be updated in response to detecting the additional capacity. The database may indicate a number of available ports for each particular connection capacity group of a provider network and the number of ports available to accept a dedicated physical connection at a particular connection capacity group may be updated in the connection capacity database in response to detecting additional capacity at the particular connection capacity group.

In response to detecting new capacity, at step 1010 a new rate for the particular connection capacity group with the additional capacity is determined. The rate may be a price charged for new connections at the particular connection capacity group. A connectivity coordinator may use updated capacity information along with a relationship described in a capacity bias model to generate the new rate. The new rate may be the price offered to clients requesting dedicated physical connection to the particular connection capacity group. As described above, in some embodiments rates offered to particular clients may be different than rates offered to other clients for connections of the same type at the same connection capacity group.

At step 1020, existing clients at the particular connection capacity group with the additional detected capacity are determined. In some embodiments, a connection capacity database may be used to determine the existing clients at the particular connection capacity group.

At step 1030 the current rate charged to a particular existing client at the particular connection capacity group with the detected additional capacity is compared to the current determined rate based on the updated capacity information.

At step 1040, if the current rate charged to the particular existing client is not greater than the current market price, then the rate of the existing client is not adjusted.

At step 1050, if the rate charged to the particular existing client is greater than the determined rate, then the rate charged to the particular existing client is adjusted to match the determined rate currently being offered for new connections. In some embodiments, a notification may be sent to the client indicating the rate reduction. In some embodiments, the rate charged to the existing client may be reduced without the client being notified.

At step 1060, it is determined if there are any additional existing clients at the particular connection capacity group with the detected additional capacity. If there are additional clients, the next particular existing client is determined at step 1080 and steps 1030, 1040, and 1050 are repeated until there are no more existing clients at the particular connection capacity group. At step 1070 when there are not any more additional existing clients at the particular connection capacity group, no further action is taken.

The steps described in FIG. 10 may be performed for any connection capacity group when an increase in the capacity at the particular connection capacity group is detected. In some embodiments, the steps in FIG. 10 may be performed periodically instead of in response to each event that results in additional capacity at a particular connection capacity group. In some embodiments, other methods may be used to ensure the rates charged to existing customers do not exceed the rates charged for new connections.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may be configured to implement the functionality described herein (e.g., the functionality of various servers and other components that implement the connectivity coordinator and connection capacity database described herein). The various methods as illustrated in the figures and described herein represent example embodiments of methods. The order of any method may be changed, and various elements may be added, reordered, combined, omitted, modified, etc.

Figure 11:
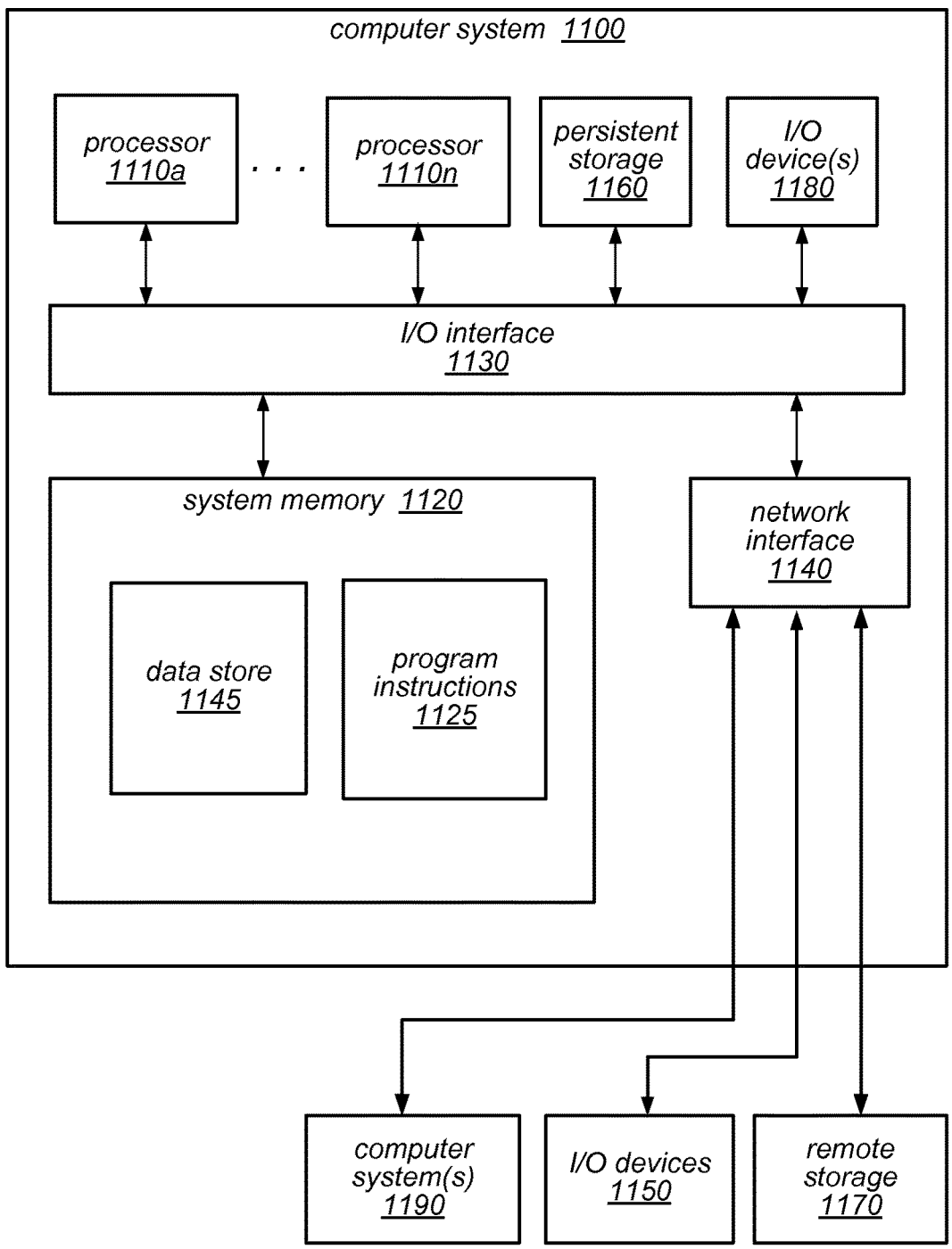
FIG. 11 is a block diagram illustrating an example computing system, according to some embodiments.

Embodiments of managing dedicated physical connections to a provider network using a bias model as described herein may be executed on one or more computer systems, which may interact with various other devices. FIG. 11 is a block diagram illustrating an example computer system, according to various embodiments. For example, computer system 1100 may be configured to implement nodes of a provider network, such as may implement various resources, a control plane, or diagnostic agents, and/or a client, in different embodiments. Computer system 1100 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1100 includes one or more processors 1110 (any of which may include multiple cores, which may be single or multi-threaded) coupled to a system memory 1120 via an input/output (I/O) interface 1130. Computer system 1100 further includes a network interface 1140 coupled to I/O interface 1130. In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA. The computer system 1100 also includes one or more network communication devices (e.g., network interface 1140) for communicating with other systems and/or components over a communications network (e.g. Internet, LAN, etc.). For example, a client application executing on system 1100 may use network interface 1140 to communicate with a server application executing on a single server or on a cluster of servers that implement one or more of the components of the system described herein. In another example, an instance of a server application executing on computer system 1100 may use network interface 1140 to communicate with other instances of the server application (or another server application) that may be implemented on other computer systems (e.g., computer systems 1160).

In the illustrated embodiment, computer system 1100 also includes one or more persistent storage devices 1160 and/or one or more I/O devices 1150. In various embodiments, persistent storage devices 1160 may correspond to disk drives, tape drives, solid state memory, other mass storage devices, or any other persistent storage device. Computer system 1100 (or a distributed application or operating system operating thereon) may store instructions and/or data in persistent storage devices 1160, as desired, and may retrieve the stored instruction and/or data as needed. For example, in some embodiments, computer system 1100 may host a storage system server node, and persistent storage 1160 may include the SSDs attached to that server node.

Computer system 1100 includes one or more system memories 1120 that are configured to store instructions and data accessible by processor(s) 1110. In various embodiments, system memories 1120 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1120 may contain program instructions 1125 that are executable by processor(s) 1110 to implement the methods and techniques described herein. In various embodiments, program instructions 1125 may be encoded in platform native binary, any interpreted language such as Java™ byte-code, or in any other language such as C/C++, Java™, etc., or in any combination thereof. For example, in the illustrated embodiment, program instructions 1125 include program instructions executable to implement the functionality of a provider network, in different embodiments. In some embodiments, program instructions 1125 may implement multiple separate clients, nodes, and/or other components.

In some embodiments, program instructions 1125 may include instructions executable to implement an operating system (not shown), which may be any of various operating systems, such as UNIX, LINUX, Solaris™, MacOS™, Windows™, etc. Any or all of program instructions 1125 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1100 via I/O interface 1130. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1100 as system memory 1120 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1140.

In some embodiments, system memory 1120 may include data store 1145, which may be configured as described herein. In general, system memory 1120 (e.g., data store 1145 within system memory 1120), persistent storage 1170, and/or remote storage 1170 may store data blocks, replicas of data blocks, metadata associated with data blocks and/or their state, configuration information, and/or any other information usable in implementing the methods and techniques described herein.

In one embodiment, I/O interface 1130 may be configured to coordinate I/O traffic between processor 1110, system memory 1120 and any peripheral devices in the system, including through network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments, some or all of the functionality of I/O interface 1130, such as an interface to system memory 1120, may be incorporated directly into processor 1110.

Network interface 1140 may be configured to allow data to be exchanged between computer system 1100 and other devices attached to a network, such as other computer systems 1190 (which may implement one or more nodes, endpoints, systems, or services internal to or external to a provider network, and/or clients of the provider network described herein), for example. In addition, network interface 1140 may be configured to allow communication between computer system 1100 and various I/O devices 1150 and/or remote storage 1170. Input/output devices 1150 may, in some embodiments, include one or more display terminals, keyboards, keypads, touchpads, scanning devices, voice or optical recognition devices, or any other devices suitable for entering or retrieving data by one or more computer systems 1100. Multiple input/output devices 1150 may be present in computer system 1100 or may be distributed on various nodes of a distributed system that includes computer system 1100. In some embodiments, similar input/output devices may be separate from computer system 1100 and may interact with one or more nodes of a distributed system that includes computer system 1100 through a wired or wireless connection, such as over network interface 1140. Network interface 1140 may commonly support one or more wireless networking protocols (e.g., Wi-Fi/IEEE 802.11, or another wireless networking standard). However, in various embodiments, network interface 1140 may support communication via any suitable wired or wireless general data networks, such as other types of Ethernet networks, for example. Additionally, network interface 1140 may support communication via telecommunications/telephony networks such as analog voice networks or digital fiber communications networks, via storage area networks such as Fibre Channel SANs, or via any other suitable type of network and/or protocol. In various embodiments, computer system 1100 may include more, fewer, or different components than those illustrated in FIG. 11 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   a provider network that provides a plurality of compute resources;
   a plurality of connection capacity groups, wherein each connection capacity group of the plurality of connection capacity groups comprises a limited number of physical ports configured to accept a dedicated physical connection for access to one or more of the plurality of compute resources of the provider network, wherein the plurality of connection capacity groups comprise at least two connection capacity groups configured to accept a dedicated physical connection from a first client of a plurality of clients; and
   one or more compute nodes implementing a connectivity coordinator configured to:
      receive a connectivity request, via a network-based interface, from the first client for connectivity from a client network of the first client to the provider network via a dedicated physical connection;
      in response to receipt of the connectivity request:
         determine a capacity for each of two or more available connection capacity groups of the plurality of connection capacity groups that comprise physical ports available to accept the dedicated physical connection from the first client, wherein each respective capacity is based on a number of physical ports available to accept the dedicated physical connection at a particular respective available connection capacity group;
         determine that there is a smaller number of connection capacity groups available to one or more others of the clients than to the first client, the availability based on a respective client's proximity to a connection capacity group;
         determine bias response information for each respective available connection capacity group based on:
            the determination that there is smaller number of available connection capacity groups available to the one or more others of the clients, and
            the determined capacity at each respective available connection capacity group, wherein the bias response information determined for at least one of the available connection capacity groups differs from the bias response information determined for an other one of the available connection capacity groups based at least in part on differing respective determined capacities for the at least one available connection capacity group and the other one of the available connection capacity groups; and send a response to the first client comprising the determined bias response information, wherein the determined bias response information comprises one or more criteria related to one or more of the plurality of connection capacity groups that are more advantageous in comparison to corresponding criteria related to one or more other connection capacity groups of the plurality of connection capacity groups.

2. The system of claim 1 wherein the system further comprises:

a capacity database comprising capacity information for each connection capacity group of the plurality of connection capacity groups; and wherein the connectivity coordinator is further configured to:

receive, from the client, a response selecting one or more of the two or more available connection capacity groups comprising physical ports available to accept the dedicated physical connection; and update the capacity information of the capacity database for the selected connection capacity group based on the client's selection.

3. The system of claim 1, wherein to determine the bias response information for each respective available connection capacity group in response to receipt of the connectivity request from the client, the connectivity coordinator is further configured to:

determine client specific bias response information for the client for each respective available connection capacity group, wherein the client specific bias response information is determined based on information about the client and based on the determined respective capacities for each respective available connection capacity group.

4. The system of claim 1, wherein:

the respective numbers of physical ports available to accept the dedicated physical connection at the respective available connection capacity groups comprise respective numbers of physical ports of a plurality of different types; and to determine the bias response information for each respective available connection capacity group, the connectivity coordinator is further configured to:

determine a capacity for a specific type of physical ports for each of two or more connection capacity groups of the plurality of connection capacity groups that comprise physical ports of the specific type available to accept the dedicated physical connection; and determine bias response information for physical ports of the specific type for each respective available connection capacity group based on the determined capacity of physical ports of the specific type at the respective available connection capacity groups.

5. A method, comprising:

receiving, by a connectivity coordinator implemented by one or more computers, a connectivity request from a client of a provider network for connectivity via a dedicated physical connection;

determining, by the connectivity coordinator, a capacity for each of two or more connection capacity groups of a plurality of connection capacity groups that each comprise physical ports available to accept the dedicated physical connection from the client, wherein each respective capacity is based on a number of physical ports available to accept the dedicated physical connection at a particular respective available connection capacity group;

determining that there is a smaller number of connection capacity groups available to one or more others of the clients than to the client, the availability based on a respective client's proximity to a connection capacity group;

determining, by the connectivity coordinator, response information for the client for each respective available connection capacity group based on:

the determination that there is smaller number of available connection capacity groups available to the one or more others of the clients, and the determined capacity at each respective available connection capacity group, wherein the response information determined for at least one of the available connection capacity groups differs from the response information determined for an other one of the available connection capacity groups based at least in part on differing respective determined capacities for the at least one available connection capacity group and the other one of the available connection capacity groups; and sending, by the connectivity coordinator, a response to the client comprising the determined response information, wherein the determined response information comprises one or more criteria related to one or more of the plurality of connection capacity groups that are more advantageous in comparison to corresponding criteria related to one or more other connection capacity groups of the plurality of connection capacity groups.

6. The method of claim 5 further comprising:

receiving, from the client by the connectivity coordinator, a response selecting one or more of the two or more connection capacity groups available to accept the dedicated physical connection; and updating capacity information of a capacity database for the selected connection capacity group based on the client's selection, wherein the capacity database comprises capacity information for each connection capacity group of the plurality of connection capacity groups.

7. The method of claim 5 further comprising:

detecting an increase in the number of physical ports available to accept a dedicated physical connection at a particular connection capacity group and updating capacity information of a capacity database for the particular connection capacity group based on the detected increase in the number of physical ports available to accept a dedicated physical connection at the particular connection capacity group, wherein the capacity database comprises capacity information for each connection capacity group of the plurality of connection capacity groups.

8. The method of claim 7 further comprising:

determining a market rate for dedicated physical connections at the particular connection capacity group to be included in the response information for the particular connection capacity group based on the updated capacity information for the particular connection capacity group.

9. The method of claim 8 further comprising:

adjusting a rate charged to existing clients of the provider network for dedicated physical connections at the particular connection capacity group based at least in part on the updated market rate for the particular connection capacity group.

10. The method of claim 5 further comprising:
    determining client specific response information for each respective available connection capacity group, wherein the client specific response information is determined based on information about a particular client requesting connectivity and based on the determined capacity at the particular respective available connection capacity group.

11. The method of claim 5 further comprising:
    determining, by the connectivity coordinator, a capacity for a specific type of physical port for each of two or more available connection capacity groups of the plurality of connection capacity groups that comprise physical ports of the specific type available to accept the dedicated physical connection, wherein the physical ports at the two or more available connection capacity groups comprise physical ports of a plurality of different types; and
    determining, by the connectivity coordinator, response information for physical ports of the specific type for each respective available connection capacity group based on the determined capacity of physical ports of the specific type at the one or more respective available connection capacity groups.

12. The method of claim 5 wherein said determining, by the connectivity coordinator, a capacity for each of the two or more available connection capacity groups is based on a current number of physical ports available to accept the dedicated physical connection at each respective available connection capacity group.

13. The method of claim 5 further comprising:
    prior to determining the capacity for each of the two or more available connection capacity groups that comprise physical ports available to accept the dedicated physical connection, determining a projected number of physical ports available to accept the dedicated physical connection, wherein the projected number of physical ports is based at least in part on information indicating one or more usage trends of physical ports at each respective available connection capacity group; and
    wherein said determining, by the connectivity coordinator, a capacity for each of the two or more available connection capacity groups is based on the projected number of physical ports available to accept the dedicated physical connection at each respective available connection capacity group.

14. The method of claim 5 wherein the response information for each particular available connection capacity group includes a market rate for dedicated physical connections at the particular available connection capacity group, wherein the market rate is based at least in part on a function that defines an inverse relationship between price and the number of physical ports available to accept the dedicated physical connection at the particular available connection capacity group.

15. A non-transitory computer-accessible storage medium storing program instructions that when executed on one or more processors implement a connectivity coordinator configured to:
    receive a connectivity request from a client of a provider network for connectivity via a dedicated physical connection;
    determine a capacity for each of two or more connection capacity groups of a plurality of connection capacity groups that comprise physical ports available to accept the dedicated physical connection, wherein each respective capacity is based on a number of physical ports available to accept the dedicated physical connection at a particular respective connection capacity group;
    determine that there is a smaller number of connection capacity groups available to one or more others of the clients than to the client, the availability based on a respective client's proximity to a connection capacity group;
    determine response information for each respective available connection capacity group based on:
        the determination that there is smaller number of available connection capacity groups available to the one or more others of the clients, and
        the determined capacity at each respective available connection capacity group, wherein the response information determined for at least one of the available connection capacity groups differs from the response information determined for an other one of the available connection capacity groups based at least in part on differing respective determined capacities for the at least one available connection capacity group and the other one of the available connection capacity groups; and
    send a response to the client comprising the determined response information, wherein the determined response information comprises one or more criteria related to one or more of the plurality of connection capacity groups that are more advantageous in comparison to corresponding criteria related to one or more other connection capacity groups of the plurality of connection capacity groups.

16. The non-transitory computer-accessible storage medium of claim 15, wherein the connectivity coordinator is further configured to:
    receive a response selecting one or more of the two or more available connection capacity groups available to accept the physical connection; and
    update capacity information of a capacity database for the selected available connection capacity group based on the client's selection, wherein the capacity database comprises capacity information for each connection capacity group of the plurality of connection capacity groups.

17. The non-transitory computer-accessible storage medium of claim 15, wherein the connectivity coordinator is further configured to:
    determine client specific response information for each respective available connection capacity group, wherein the client specific response information is determined based on information about the client requesting connectivity and based on the determined capacity at each respective available connection capacity group.

18. The non-transitory computer-accessible storage medium of claim 15, wherein the connectivity coordinator is further configured to:
    determine a capacity for a specific type of physical port for each of two or more available connection capacity groups of the plurality of connection capacity groups that comprise physical ports of the specific type available to accept the dedicated physical connection, wherein the physical ports at the two or more available connection capacity groups comprise physical ports of different types; and determine response information for physical ports of the specific type for each respective available connection capacity group based on the determined capacity of physical ports of the specific type at the two or more respective available connection capacity groups.

19. The non-transitory computer-accessible storage medium of claim 15, wherein the connectivity coordinator is further configured to:

detect an increase in the number of physical ports available to accept a dedicated physical connection at a particular connection capacity group;

update a market rate for dedicated physical connections at the particular connection capacity group based on the detected increase in the number of physical ports available to accept the dedicated physical connection at the particular connection capacity group; and adjust a rate charged to existing clients of the provider network for dedicated physical connections at the particular connection capacity group based at least in part on the updated market rate for the particular connection capacity group.

20. The non-transitory computer-accessible storage medium of claim 15, wherein the connectivity coordinator is further configured to:

determine a projected number of physical ports available to accept the dedicated physical connection at each respective available connection capacity group of the two or more available connection capacity groups, wherein the projected number of physical ports for each respective available connection capacity group is based at least in part on information indicating one or more usage trends of physical ports at particular ones of the respective available connection capacity groups; and wherein determining the capacity for each of the two or more available connection capacity groups is based on the projected number of physical ports available to accept the dedicated physical connection at each particular respective available connection capacity group.

* * * * *